United States Patent [19]

Warszawski

[11] Patent Number: 5,056,899

[45] Date of Patent: * Oct. 15, 1991

[54] MATERIAL FOR LIGHT MODULATION AND MANUFACTURING PROCESSES

[75] Inventor: Bernard Warszawski, Paris, France

[73] Assignee: Alpine Polyvision, Inc., Hackensack, N.J.

[ * ] Notice: The portion of the term of this patent subsequent to Oct. 8, 2008 has been disclaimed.

[21] Appl. No.: 462,977

[22] Filed: Jan. 10, 1990

Related U.S. Application Data

[63] Continuation of Ser. No. 221,540, Jul. 19, 1988, abandoned.

[30] Foreign Application Priority Data

Jul. 24, 1987 [FR] France .................. 87 10561

[51] Int. Cl.$^5$ .................................. G02F 1/01
[52] U.S. Cl. ........................................ 350/357
[58] Field of Search ............................ 350/357

[56] References Cited

U.S. PATENT DOCUMENTS

| | | | |
|---|---|---|---|
| 4,188,095 | 2/1980 | Nishimura et al. | 350/357 |
| 4,285,575 | 8/1981 | Imataki et al. | 350/357 |
| 4,538,158 | 8/1985 | Warszawski | 350/357 |
| 4,571,029 | 2/1986 | Skotheim et al. | 350/357 |
| 4,596,722 | 6/1986 | Warszawski | 350/357 X |

FOREIGN PATENT DOCUMENTS

| | | |
|---|---|---|
| 0006793 | 1/1980 | European Pat. Off. . |
| 0027755 | 4/1981 | European Pat. Off. . |
| 0167321 | 1/1986 | European Pat. Off. . |
| 3514281 | 10/1985 | Fed. Rep. of Germany . |
| 2351463 | 12/1971 | France . |
| 2260167 | 8/1975 | France . |
| 2333266 | 6/1977 | France . |
| 2334737 | 7/1977 | France . |
| 2348542 | 11/1977 | France . |
| 2352361 | 12/1977 | France . |
| 2369585 | 5/1978 | France . |
| 2504290 | 10/1982 | France . |
| 2524678 | 10/1983 | France . |
| 59-195629 | 11/1984 | Japan . |
| 61-138238 | 6/1986 | Japan . |
| 61-223724 | 10/1986 | Japan . |
| 61-119527 | 5/1987 | Japan . |
| 909342 | 10/1962 | United Kingdom . |
| 1586104 | 3/1981 | United Kingdom . |

Primary Examiner—Eugene R. Laroche
Assistant Examiner—Michael Shingleton
Attorney, Agent, or Firm—Mason, Fenwick & Lawrence

[57] ABSTRACT

An electrolytic material intended for a process relating to a light-modulating cell involving electrochromic reflection or transmission. The electrolytic material is a homogeneous mixture of solid consistency, comprising at least (a) a water-soluble salt or salts of one metal which can be cathodically deposited from an aqueous solution of one of its ions; (b) one initially water-soluble film-forming polymer resin; and (c) water. The material has ionic conductivity and deformability, and can be formed in a thin continuous layer. It has at least the functions of participating in the erasure of a picture element earlier written in the light-modulating cell, and of enabling the flow of electrical current between a working electrode and a counter-electrode during writing and erasure steps.

50 Claims, 10 Drawing Sheets

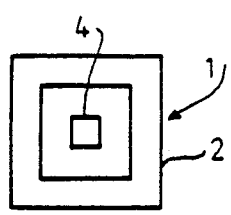
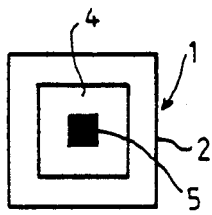
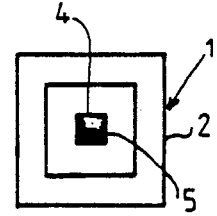
FIG.1A     FIG.2A     FIG.3A
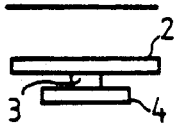
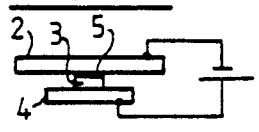
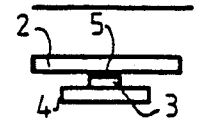
FIG.1B     FIG.2B     FIG.3B
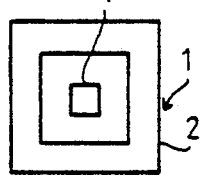
FIG.4A
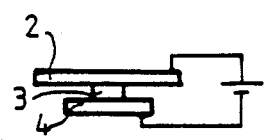
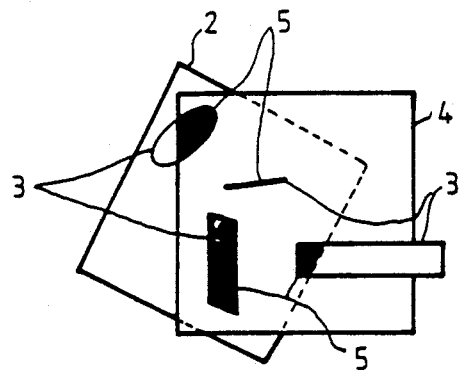
FIG.4B     FIG.5
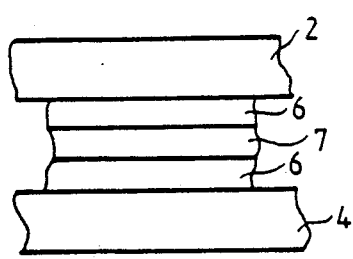
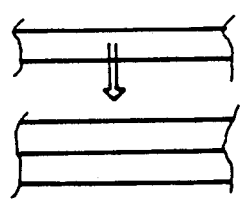
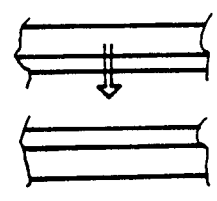
FIG.6     FIG.7A     FIG.7B

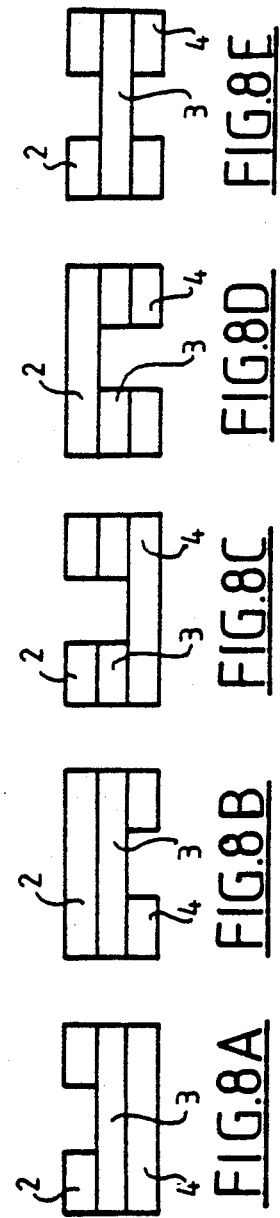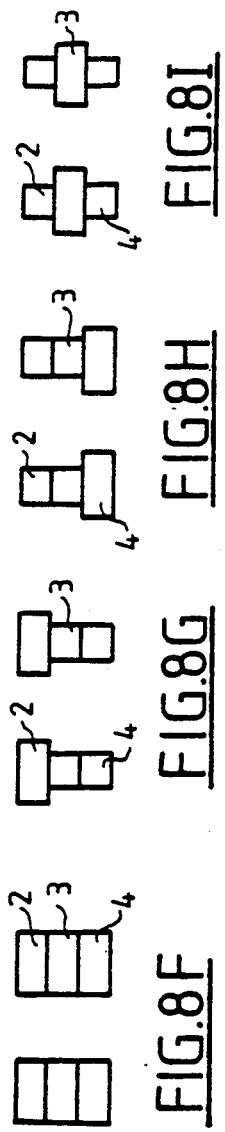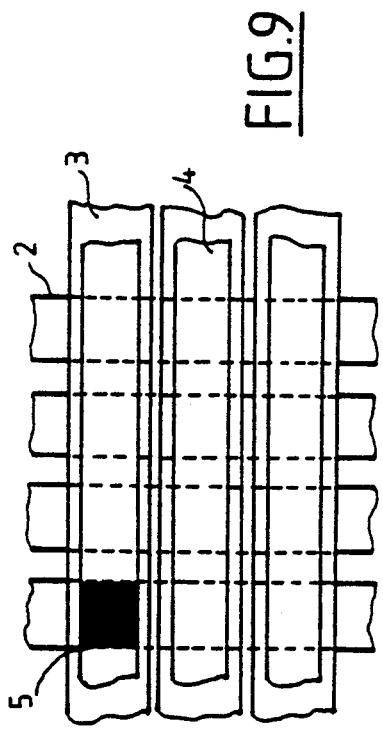

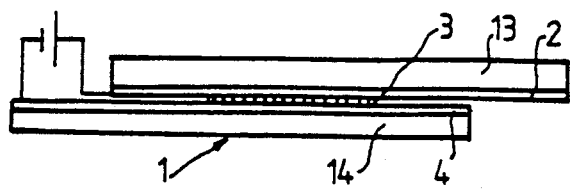
FIG.10
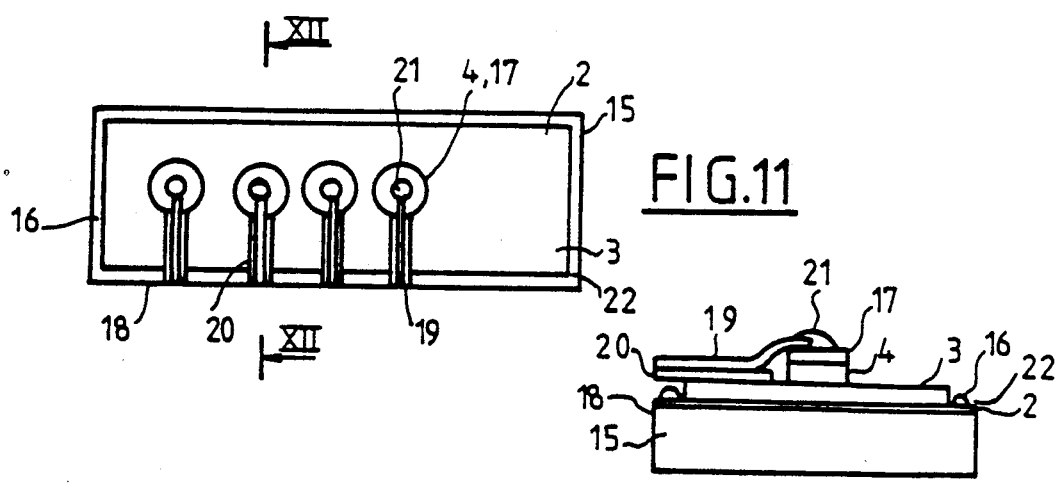
FIG.11
FIG.12
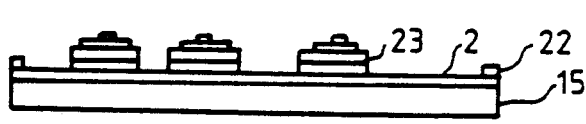
FIG.13
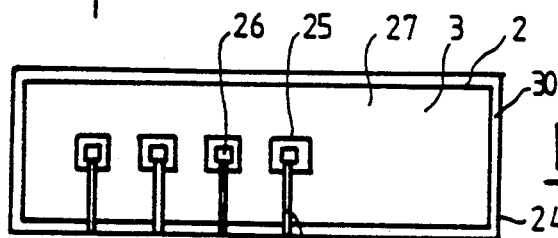
FIG.14
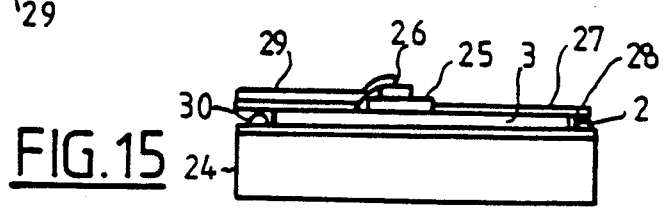
FIG.15

MATERIAL FOR LIGHT MODULATION AND MANUFACTURING PROCESSES

This application is a continuation of U.S. Ser. No. 07-221,540 filed Jul. 19, 1988, now abandoned.

BACKGROUND OF THE INVENTION

1. Field of the Invention

The invention relates to electrolytic materials for light modulation, and to processes for their manufacture. In particular, the electrolytic materials find application in devices for variable reflection of light, variable transmission of light, and display of signals and images such as alphanumerical, graphical and other optical information. The invention applies to various electro-optical devices, such as display panels, screens, variable transparency windows, shop windows, windscreens, spectacles, light valves, shutters, variable reflection mirrors, memories, and so forth.

2. Related Art

Numerous processes and devices for light modulation are known. Among those of particular interest are those enabling the production of electro-optical devices which are very thin with respect to their area, in particular with regard to display devices and in particular flat screens of so-called liquid crystals, electrochromic and electrophoretic type.

Among these various light-modulating techniques, the electrochromic processes use the reversible change of color and/or of optical density obtained by the electro-chemical oxidoreduction of a so-called electrochromic material whose oxidized form and whose reduced form have different colors and/or optical densities.

Electrochromic light-modulating processes have characteristics which are noteworthy for numerous applications: low control voltage (having a maximum of a few volts); low energy consumption; open circuit (nonvolatile) memory; and relatively uncritical distance requirements between electrode and counter-electrode. They also have other characteristics which are particularly advantageous for display devices:, very high contrast even when viewed laterally at a high angle; excellent visibility by reflection under high-illumination conditions such as in bright sunshine; extended grey scale; and wide operating temperature range (often extending to low temperatures).

The low control voltage enables the use of low cost electronic control and addressing means. Furthermore, low energy consumption enables applications where independent operation (on batteries or accumulators) is required.

However, known processes and electrochromic devices have a certain number of disadvantages which limit their fields of application.

In general, elementary cells of known electrochromic light modulating devices are sealed (individually or in combination with other cells) in a way which is strictly leak-tight with respect to the external ambient atmosphere. Known cells generally comprise (1) a transparent front electrode deposited on (2) a transparent plate of glass or plastic material, (3) an electrochromic material (often in the form of a thin layer deposited on the transparent electrode), (4) a gap, filled with electrolyte, (5) a counter-electrode (also transparent if the device functions by transmission), and (6) conductors for electrical connection of each electrode to an electronic control means external to the cell. Known cells also most often comprise a specific separator intended to maintain between the electrode and the counter-electrode an electrolyte-filled gap of constant thickness. Known cells also comprise structural means employing material and seals intended to maintain cohesion and permanence of internal physical and electrical contacts which are necessary for correct operation. At least the front electrode and/or the layer of electrochromic material are delimited in such a way as to define the shape required for the corresponding picture element (such as image point or image segment).

A strictly leak-tight sealing is necessary to prevent loss (particularly by leakage or evaporation) of constituents of the internal medium, particularly constituents of the electrolyte. Leak-tight sealing is also necessary to prevent the entry into the cell of constituents of external ambient atmosphere (for example, oxygen, carbon dioxide, humidity, and various contaminating substances) which are often capable, even in traces, of altering or degrading the constituents of the internal medium, of introducing parasitic processes, of affecting the operation of the cell, and of reducing its lifetime.

The sealing problem is a significant problem at points where the cell must provide a sealed passage for the conductors connecting the front electrode and the counter-electrode to the external electronic means. The seals, which must be compatible with the various materials used, are subject to mechanical stresses resulting in particular from differences between the coefficients of expansion of these materials.

This sealing problem is aggravated when the dimensions of the device are increased. Stresses of thermal origin can increase because of asymmetry in exposure to heat sources. Stresses of mechanical origin occur, due to vibrations to which a panel of large dimensions is naturally exposed. Interaction with the structure for mounting and holding the panel also introduce stresses.

The necessity of such a strictly leak-tight sealing, and the problems which it raises, are explicitly mentioned and justified by numerous documents, with respect to electrochromic materials, electrolytes and various structures. In particular, reference is made to U.S. Pat. No. 4,127,853; FR 83,041,162 (cell containing a metallic oxide as an electrochromic material and a liquid organic electrolyte from which the molecular oxygen must be removed); FR 7,443,548 (for several classes of solid electrolytes, necessary support —using a sealed casing—of particular conditions of humidity, pressure, vacuum or gaseous atmosphere essential for the correct operation of the device); U.S. Pat. No. 4,128,315 (sealing necessary to prevent loss of humidity); U.S. Pat. No. 4,116,546 (use of a solid electrolyte for the particular purpose of avoiding rapid degradation of the seal observed with liquid or acidic semi-solid electrolytes); U.S. Pat. No. 4,167,309 (protection from atmospheric oxygen of radical type electrochromic materials); U.S. Pat. No. 3,704,057 (seal for sealing a cell containing tungsten trioxide as an electrochromic material and a semi-solid gelled electrolyte); U.S. Pat. No. 3,708,220 (cell preventing any leakage by self-sealing of the electrolyte inlet orifice); J. Duchene et al, IEEE Transactions on Electron Devices, Vol. RD-26, No. 8, August 1986, p. 1263 (electro-deposited cell with organic liquid electrolyte sealed by a sealing glass).

In known electrochromic processes and devices, there are several types of electrochromic materials and generation erasure mechanisms of optical density and/or of coloring, each having its own problems which add to the problems described above. These problems include the following:

1) Oxidoreduction of non-stoechiometric electrochromic solids. A considerable number of electrochromic solids have been used, which are generally solids which are insoluble in the two states of oxidation between which they change color; these solids are electrically insulating or slightly conducting. Among inorganic materials the following can be particularly mentioned among others: $WO_3$, $MoO_3$, $V_2O_5$, $Nb_2O_5$, $IrO_x$. (An extensive list is given, for example, in U.S. Pat. No. 3,704,057.) Among organic materials are diphthalocyanine of Lu, and of Yb in particular.

These electrochromic solids must generally be used by depositing a thin layer on the transparent electrode by means of costly vacuum deposition techniques (evaporation under vacuum, cathodic sputtering in particular). Their change of color is generally from colorless or from a primary color to a second different color: colorless to blue for $WO_3$ and $MoO_3$, yellow to green for $V_2O_5$, colorless to blue or blue-black for $IrO_x$, green to red for diphthalocyanin of lutecium.

The most-used of these electrochromic solids, tungsten trioxide $WO_3$, has problems, in addition to those already mentioned, which are representative of those of this class of electrochromic materials: very high sensitivity to contaminating substances, particularly atmospheric (document FR 83,041,162), degradation by corrosion with dissolution in the aqueous and polymeric electrolytes (U.S. Pat. No. 4,215,915, U.S. Pat. No. 3,970,365), reduced but not eliminated inorganic electrolytes (Kodintsev et al., Electrokhimiya 1983, Vol. 19, No 9, page 1137).

Complex techniques, for example oblique evaporation (U.S. Pat. No. 4,390,246), are required for improving the color generation and erasure characteristics which are very sensitive to slight changes in preparation and composition. In most display devices (for example U.S. Pat. No. 4,128,315), the tungsten trioxide film must be deposited with a delimitation according to the shape and dimensions of the picture element (image segment or image point). Finally, the cells have neither the voltage threshold nor the memory in a circuit coupled to other cells which would be necessary for multiplexed matrix operation (Yoshiro Mori, J.E.E., August 1985, page 53).

2) Oxidoreduction of radical compounds. The most representative and most studied of the materials of this class is heptyl-viologen. Dissolved in the electrolyte where it is colorless, heptyl-viologen deposited by reduction is a blue or red colored film on the transparent electrode and is redissolved by oxidation (U.S. Pat. No. 4,116,535). But it is known that the deposit progressively recrystallizes in a form which cannot be redissolved, which severely limits the number of accessible cycles and the lifetime. Alternatively, the electrode passivates, considerably reducing the speed of the writing reaction for which it is then necessary to catalyze, for example, by depositing metallic ions (document EP 0,083,668). Finally, the cells do not have either a threshold or a memory in a circuit coupled to other cells.

3) Electrodeposition of metals. The reversible electrodeposition of metals from an electrolytic solution has been the subject of various works, particularly with liquid organic electrolytes, because of corrosion problems and parasitic reactions harmful to the stability and lifetime encountered with aqueous electrolytes. For example, Y. Duchene et al. (in the article cited above), describes a display cell which uses as an electrolyte, methanol or acetonitrile containing silver iodide and sodium iodide. The silver ions reduce into a silver film having a high contrast. However, for a given electrical charge, the optical density depends on the current density used, and inhomogeneities appear on the deposited film after a certain number of deposition redissolution cycles. The cell does not have a writing voltage threshold and is not therefore suitable for multiplexed matrix writing. The zone of the transparent electrode corresponding to the display must be delimited inside the cell by means of an insulating layer engraved according to the design of the zone in question. Finally, the use of a glass sealing technology is indicated as one of the conditions of reliability, confirming the importance of strictly leak-tight sealing.

A similar cell described by I. Camlibel et al. (Appl. Phys. Letters 33,9, Nov. 78, page 793) contains silver iodide and potassium iodide in dimethylsulphoxide, and produces a specular gilt or bright red deposit, depending on conditions.

4) Electro-active polymers (redox). Recent works relate to polymers such as polyaniline, polyacetylene, polyrrole, and polythiophene, in particular which, in thin layer on a transparent electrode, can change color (for example from red to blue for polythiophene] depending on their state of oxidation. These materials, which are generally rather unstable or easily alterable, have a short lifetime and do not enable a very large number of operating cycles.

It has been seen that most known electrochromic cells do not have a definite electrical voltage threshold (i.e., an electrical voltage below which a picture element is not written). Furthermore, although most of these cells have an open circuit (nonvolatile) memory (i.e., a persistence of the written state when the electrical writing voltage is disconnected), this memory partially discharges if a written cell is connected to an erased cell, such that the first cell partially erases while the second partially writes. In this event, the optical density of the cells tends to become uniform with time. The absence of a definite writing threshold and/or a persistent memory in a circuit coupled to another erased cell, prohibit the matrix writing of a system of picture elements placed at the intersections of two orthogonal arrays of parallel conductors.

Analysis confirms that the non-selected picture elements are partially written while the selected picture elements are partially erased. The optical density of the selected picture elements and that of the nonselected picture elements approach each other, thus degrading contrast and even eliminating it.

In known systems, it is exceptional to obtain a genuine black in the written state. It is also uncommon to obtain a genuinely white or colorless transparent appearance in the erased state. Generally, colors such as blue, blue-black, purple, and so forth, are obtained. Apart from the aesthetic preference for a color or for black, the production of a particular color prohibits a multi-color display by a three-color process (unless it becomes possible to generate the three primary colors). On the other hand, the production of a genuine black in the written state and a genuine white in the erased state (or a colorless transparent appearance in transmission) enables multicolor display by additive synthesis by associating picture elements with blue, green and red colored screens or filters according to a repetitive distribution.

Numerous known electrochromic devices use a liquid electrolyte (for example, an aqueous electrolyte such as an aqueous solution of sulfuric acid (document FR 7,626,282), or an organic electrolyte such as a solution of lithium perchlorate in propylene carbonate (Yoshiro Mori article, cited above)). This electrolyte, which cannot generally be common to several cells for electrical reasons, requires individual confinement in each cell which must comprise an electrolytic compartment which must not be distorted. In addition to the problems raised by the individual filling and sealing of each cell, the particularly complex structure which is obtained, despite its cost, does not enable a high resolution display device (such as a computer screen). If it appears possible to reduce the size of the picture element to the necessary values (of the order of a few hundred microns), the size of the cell (and particularly the needed lateral walls), does not enable reduction of the gap between adjacent image-points to a value which should be of the order of a few tens of microns at most.

In order to reduce the complexity of the display cell brought about by the problems of confinement of liquid electrolyte, there has been used gelled semisolid liquid electrolytes (U.S. Pat. No. 3,708,220: gelled sulfuric acid), polymers with acidic functions (U.S. Pat. No. 4,116,545), and ion exchange membranes (U.S. Pat. No. 4,128,315). The structure of the cells is actually simplified, and in certain cases has the additional advantage of surface adhesion properties (tackiness), simplified construction, and viscoelastic properties which improve the contacts. But all of these electrolytes used in association with a layer of solid electrochromic material deposited on the transparent electrode contain, in one way or another, a certain quantity of water (by constitution, hydration, impregnation, and so forth). The cells have, to varying degrees, the corrosion problems mentioned above, as well as the necessity of a leak-tight sealing.

In view of avoiding the use of a free liquid electrolyte, inorganic solids have also been used which have ionic conductivity, such as for example beta alumina (M. Green et al., Solid State Ionics 3/4, 1981, pages 141 to 147, North-Holland), or polymers having ionic conduction such as, for example, solid solutions of lithium perchlorate in polyethylene oxide (document FR 8,309,886). However, it is well known that such solid electrolytes, at ambient or ordinary temperatures have only a generally very low ionic conductivity, considerably impeding the speed of writing and erasure which may require several seconds or even more. Furthermore, a progressive degradation of the electrical contact between the inorganic solid electrolytes and the electrodes is often observed. This degradation has a harmful effect on the lifetime of the light-modulating cells.

In known electrochromic devices, the counter-electrode is often of complex and expensive manufacture and structure because of the functions that it may have to simultaneously provide. The functions include the auxiliary redox function, maintaining a constant specified electrode potential, high charge capacity, reversibility, and so forth, while being capable of a high number of cycles without degradation. For example, a counter-electrode has been produced comprising a second layer of an electrochromic solid modified in such a way as to have a low electrochromicity and deposited on a transparent electrode (U.S. Pat. No. 4,278,329). Another known counter electrode is a sheet of paper formed with acrylic fibers, a binder and carbon powder, in which there is also incorporated an electrochromic solid (U.S. Pat. No. 4,088,395). Another counter-electrode whose electrode potential is adjustable comprises carbon powder, a binder and mixtures of depolarizers $W_{18}O_{49}$ and $V_6O_{13}$ in adjustable proportions (Yoshiro Mori article cited above).

The structure and manufacture of known electrochromic display screens are generally complex and expensive, especially when the size of the panel is large. Beyond a certain size, technical problems and manufacturing costs become such that large display panels can only be produced in the form of a mosaic of small independent panels.

There is also known (in document FR 2,504,290) a process for recording signals and images in which:

1) A recording medium is formed, comprising at least an electrochromic material having at least one free surface constituted by a mixture of solid consistency of at least (a) a water-soluble salt or a water-soluble mixture of salts of at least one metal which can be cathodically deposited from an aqueous solution of one of its ions; and (b) an initially water-soluble film-forming polymer resin, preferably in the proportion of 1 part by weight to 0.5 to 50 parts of anhydrous salts; and (c) water;

2) There is placed in contact with the free surface of the electrochromic material, at a place where it is desired to form a mark, an electrode, taken, with respect to the said material, to a negative potential in order to make an electrical current flow between the electrode and the material;

3) There is formed in the electrochromic material, in the zone of contact with the electrode, a mark which is immediately and directly visible by cathodic reduction of at least one depositable metallic ion and is present in the material, and at least one metal which electrocrystallizes and is an integral part of the material, the metal constituting the mark.

According to this document, the electrochromic material, and the process for its implementation, intend to obtain a mark (signal or image) which is essentially stable in time.

On the other hand, this document is not interested in, does not suggest and does not describe the application of such an electrochromic material for modulating light nor a corresponding implementation process.

SUMMARY OF THE INVENTION

The present invention relates, first, to an electrolytic material for light modulation which avoids the mentioned disadvantages of the known materials, and, second, to a process of manufacturing such a material.

One object of the invention is to provide an electrolytic material for the practice of a light modulation process, the material having a solid consistency in the absence of externally applied stresses, and normally of continuous texture. This makes possible the realization of continuous small-thickness layers which are transparent and capable of being opacified with, for example, a contrasting pigment. The material has, in combination, electrochromism properties, ionic conduction properties, auxiliary redox properties, and plastic or viscoelastic properties. The material has, further, contact or surface adhesion properties, and is capable of being manufactured directly or by way of a fluid formative composition.

An object of the invention is to provide an electrolytic material which is intended, more especially, for a process relating to a light-modulating cell involving electrochromic reflection or transmission.

The material is characterized by the features, in combination: (1) a homogeneous mixture of solid consistency, the homogeneous mixture comprising at least (a) a water-soluble salt or a water-soluble mixture of salts of at least one metal which can be cathodically deposited from an aqueous solution of one of its simple or complex ions; (b) at least one initially water-soluble film-forming polymer resin, preferably in the proportion of one part by weight to 0.05 to 50 parts of anhydrous salts; and (c) water; (2) it has ionic conductivity; (3) it has plastic or viscoelastic deformability; (4) it can be formed in a thin continuous layer; and (5) it has at least the functions of participating in the writing of a picture element, of participating in the erasure of the picture element, and of enabling flow of electrical current between a working electrode and a counter-electrode of an elementary light-modulating cell during the writing and during the erasure.

It accomplishes this by steps comprising:

(a) developing, by cathodic reduction of depositable metallic ions which it contains, and in combination with the working electrode, a metallic image (comprising the writing step); (b) erasing, by anodic oxidation of this image and reincorporation into the original state of the metallic ions produced by this oxidation in combination with the working electrode, the previous metallic image (comprising the erasing step); and (c) carrying in each of the two directions, electrical charges in ionic form, between the working electrode and the counter-electrode, charges carried in each direction in quantities equal to (in one direction) the electrical charges injected in electronic form into the electrolytic material by the working electrode during the writing; and (in the other direction) the electrical charges extracted in electronic form from the electrolytic material by the working electrode during erasure.

According to further characteristics of the invention, the electrolytic material also provides the following characteristics, either separately or in combination.

The material comprises ions of only one metal or of several metals selected from metals which are cathodically depositable alone or co-depositable with others from an aqueous solution. A metal is chosen from the group comprising zinc, cadmium, lead, silver, copper, iron, cobalt, nickel, tin, indium, platinum, palladium, gold, bismuth, antimony, tellurium, manganese, thallium, selenium, gallium, arsenic, mercury, chromium, tungsten and molybdenum. Copper, selected from the metals, is associated with at least one other metal. The water-soluble salt or the water-soluble mixture of salts is hygroscopic and, preferably, deliquescent in the presence of atmospheric humidity. It comprises halide anions.

A primitively water-soluble polymer resin is chosen from the group comprising polyoxyethylene, polyvinylpyrrolidone, polyvinyl alcohol, the cellulose ethers, sodium alginate, polyacrylic acid and its derivatives, gelatin, gum arabic, polystyrene sulphonic acid and polyacrylamide. The molecular weight of the initially water-soluble polymer resin is between 10,000 and 10,000,000. It furthermore has contact adhesion properties, particularly a tacky touch or sticky contact.

It also comprises at least one water-soluble salt of a cation which cannot be electrodeposited from an aqueous solution. A cation which cannot be electrodeposited from an aqueous solution is chosen from the group comprising the alkali metals, the alkaline earths, aluminum, beryllium, rare earths which cannot be electrodeposited from an aqueous solution, cations which cannot be reduced to a metal, particularly the ammonium ion, and the quaternary ammonium ions.

It further comprises at least one dispersed particulate solid. A layer of electrolytic material is transparent or substantially transparent for the purpose of being associated with a transparent counter-electrode in an elementary cell functioning by transmission. The dispersed particulate solid is a masking and/or contrasting pigment for the purpose of being associated, in the form of a layer, with the electrodes of an elementary cell functioning by reflection. It comprises at least one white pigment such as titanium dioxide, particularly in the rutile or anatase crystalline forms, dispersed in particulate form in at least a part of the thickness of layer of electrolytic material. It comprises at least one colored pigment. It further comprises at least one homogeneously mixed dye or coloring agent. It further comprises at least one auxiliary redox couple. The auxiliary redox couple is, in its reduced form, water-soluble in the presence of the other water-soluble constituents of the material and is colorless or only slightly colored in the concentrations and small thicknesses used.

It further comprises at least one acid having, in particular, functions of maintaining the pH of the material at an appropriate value, of preventing the hydrolysis of metallic salts and/or the gelling or the syneresis or the flocculation of the resin in the material. An acid is chosen from the group comprising hydrochloric acid, hydrobromic acid, acetic acid, perchloric acid, chloric acid, formic acid, nitric acid or equivalent.

It further comprises at least one cross-linking or vulcanization agent of the resin, having the function, in particular, of permitting strengthening of the mechanical qualities of the electrolytic material, particularly its hardness and its cohesion.

It further comprises at least one complexing agent having the function, in particular, of favoring the solubilization of metallic salts and/or the co-deposition of several ions into a metallic alloy.

It further comprises at least one agent, compound, substance or constituent, in a homogeneous or dispersed mixture, having functions, in particular, of improving the stability and/or the optical and/or mechanical and/or electrical properties of the material; and/or the appearance and/or the other characteristics of the picture element; and/or the succession of writing and erasing phases, and therefore the reversibility of the modulation process and/or its repeatability; and/or the speed of writing and/or erasure; and/or the existence or the value of an electrical writing threshold voltage; and/or the electro-optical characteristics.

It further comprises at least one agent having the function of favoring the formation of a layer and/or the application of a layer of the electrolytic material, such an agent being a surface-active agent or wetting agent.

The ratio of the water-soluble salts (anhydrous) to water is preferably greater than 0.5 and more especially greater than 1.

A further object of the invention is to provide a process for manufacturing such an electrolytic material, characterized in that it comprises at least the steps of (1) forming at least one fluid formative composition comprising at least the constituents of the electrolytic material and water in quantities such that this fluid formative composition has an appropriate viscosity, particularly for its application as a layer; and (2) acting on this fluid formative composition for the purpose of giving the material its solid consistency.

Furthermore, the fluid formative composition is acted upon by evaporation, by heat treatment, by cross-linking or by vulcanization.

The invention enables, as described below, the overcoming the disadvantages of known light-modulating techniques and the writing, erasing and maintaining a picture element in written or erased state, in a reversible and repetitive way, which is not foreseen in the document FR 2,504,290.

Other characteristics of the invention will be understood with the help of the accompanying drawings and the following Detailed Description.

BRIEF DESCRIPTION OF THE DRAWINGS

FIGS. 1A, 1B, 2A, 2B, 3A, 3B, 4A, and 4B are four pairs of drawings showing for each pair a top plan view and a side elevational view of an elementary display cell. FIG. 1A and 1B show the cell at rest. FIGS. 2A and 2B show the cell during a write phase. FIGS. 3A and 3B show the cell in a maintaining phase. FIGS. 4A and 4B show the cell in an erase phase.

FIG. 5 is an elevation view showing the writing of picture elements by combined superimposed patterns of the electrode, counter-electrode and electrolytic material.

FIG. 6 is a cross-sectional view showing one embodiment of the layer of the present electrolytic material.

FIG. 7A is a cross-sectional view showing a second embodiment of a cell.

FIG. 7B is a cross-sectional view showing a third embodiment of a cell.

FIG. 8A is a cross-sectional view showing a first embodiment of a modulating cell.

FIG. 8B is a cross-sectional view showing a second embodiment of a modulating cell.

FIG. 8C is a cross-sectional view showing a third embodiment of a modulating cell.

FIG. 8D is a cross-sectional view showing a fourth embodiment of a modulating cell.

FIG. 8E is a cross-sectional view showing a fifth embodiment of a modulating cell.

FIG. 8F is a cross-sectional view showing a sixth embodiment of a modulating cell.

FIG. 8G is a cross-sectional view showing a seventh embodiment of a modulating cell.

FIG. 8H is a cross-sectional view showing an eighth embodiment of a modulating cell.

FIG. 8I is a cross-sectional view showing a ninth embodiment of a modulating cell.

FIG. 9 is a top plan view of a tenth embodiment of a device constructed using strip material for the component parts.

FIG. 10 is a cross-sectional view corresponding to the embodiment of Example 1 (in the Detailed Description).

FIG. 11 is an elevation view corresponding to the embodiment of Example 4.

FIG. 12 is a cross-section view taken along the line XII—XII of FIG. 11.

FIG. 13 is a cross-section view corresponding to the embodiment of Example 6.

FIG. 14 is an elevation view corresponding to the embodiment of Example 7.

FIG. 15 is a cross-section view taken along the line XV—XV of FIG. 14.

DETAILED DESCRIPTION OF THE PREFERRED EMBODIMENTS

Definitions

Figure 16:
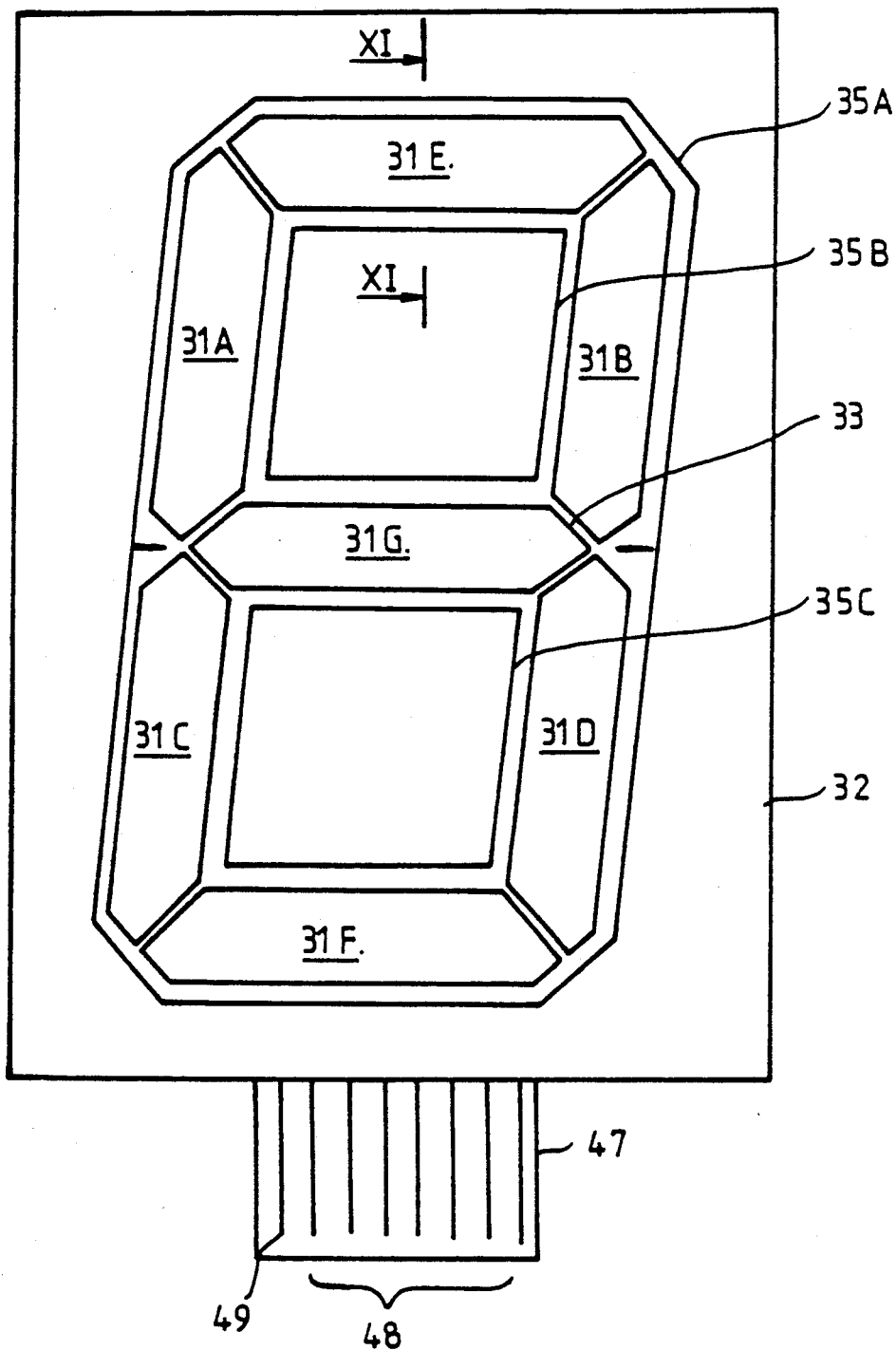
FIGS. 16 is a front elevation view of a display panel with direct addressing corresponding to the embodiment of Example 11.
Figure 17:
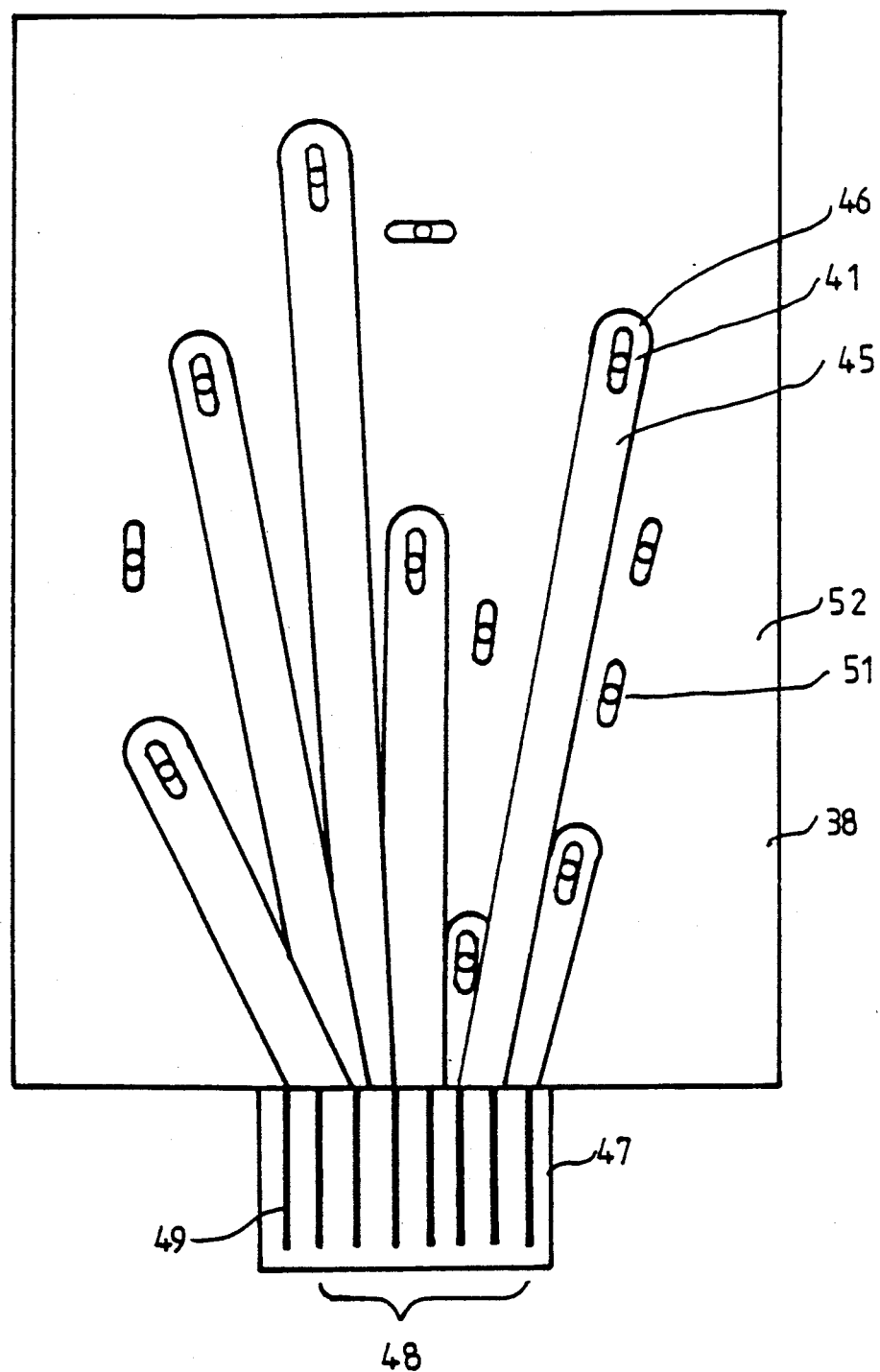
FIGS. 17 is a rear elevation view of a display panel with direct addressing corresponding to the embodiment of Example 11.

Throughout the following description, certain technical terms are used having the following definitions:

"Picture element" (or "pixel"), "image point" and "image segment" all relate to a delimited zone or area having an optical density capable of being increased and conversely reduced to return to its original appearance. When the optical density of such an area is increased, the area will acquire, when viewed by reflection, a coloring or darkening. If the material used to form the area is transparent, the area will become partially or completely opaque, when viewed by transmission, upon having its optical density increased. When the optical density of such an area is reduced, the area assumes its original reflection characteristics and/or original transparent quality.

The term "image point" preferably refers to a small area, often of circular, square or slightly rectangular shape, repeated on the surface of a screen of a display device. Thus, such a display device contains a plurality of image points, each which may represent one node of a network which occupies regions or the totality of the area of the screen. Networks occupying regions of the screen may assume geometric shapes including a square, centered square, and compact hexagon.

The term "imaqe segment" preferably refers to a relatively large display screen area. Image segments may be associated, on the surface of a display device screen which contains a plurality of image segments, with other image segments of the same shape and/or of different shapes according to specific geometric arrangements. One well-known geometric arrangement of image segments is the seven-segment arrangement employed in light-emitting-diode (LED) or liquid crystal display (LCD) devices enabling representation of numerals 0 to 9 by selective coloring or opacifying of appropriate combinations of these segments.

The term "picture element" (or its usual abbreviation "pixel") means either an image point or an image segment.

"Electrochromic modulation" refers to selective illumination and darkening of a device under electrical control.

"Elementary light-modulating cell" or "elementary light-modulating device" (abbreviated as "elementary device" or "elementary cell") refer to the complete structure necessary for electrical control and selective illumination of a picture element. An elementary electrochromic modulation cell comprises the following components, suitably arranged and associated:

(a) a first transparent electrode, also called the working electrode;

(b) a second electrode or counter-electrode (which may be transparent or non-transparent, depending on whether the picture element is observed by direct transmission of light or by reflection);

(c) an ionic conductor or electrolytic material placed between the electrodes;

(d) means of electro-chromism;

(e) means of electrical connection to an external source of electrical voltage enabling the cell to be controlled; and (f) means of addressing (direct, multiplexed, and so forth) enabling its selective control (present if an elementary cell is part of a multiplicity of elementary cells in one same display device).

In the following text, the expression "elementary modulating cell" is preferred for denoting the above minimum structure including items (a) through (e) which is required for obtaining a picture element.

The expression "elementary device" denotes a device comprising a single elementary cell and extrinsic components necessary for its functioning, combined with one or more other elementary devices in a composite device having a plurality of associated cells. Such extrinsic constituents or components include electrical connections associated with the electrodes; means for masking the periphery of the cell; and a transparent substrate for the transparent electrode.

"Independent light-modulating device" refers to at least one elementary modulating device and other specific components enabling the device to be used as an independent unit, including:

(a) mechanical supports or substrates providing the independent device with structural rigidity;

(b) a casing;

(c) an encapsulation;

(d) electrical connections inside the independent device;

(e) connection connector(s) or zone(s) to which are connected, by means of internal electrical connections, elementary devices of the independent device, enabling easy connection of the latter to the control and addressing electronics and to the associated electrical energy source;

(f) a printed circuit board possibly able to serve, singly or in combination, as a mechanical support, connector or connector support, or support of part of the associated electronics.

Such an independent device can, for example, be a device commonly called a display device panel or screen, or may be any of various electro-optical devices.

"Screen area of a display device" refers to the area which comprises, surrounds and connects all of the picture elements of the device.

"Picture element and elementary modulating cell" also refers to any area which can be colored or increased in optical density and the corresponding elementary cell, whatever their shape and size may be. Such light-modulating devices in some instances do not comprise actual information display devices, but instead permit variable transmission or variable reflection of light. In some such devices only one elementary cell is provided. Such devices include windows, shop windows, screens, windscreens, and spectacles having variable transparency, light valves, shutters, variable reflection mirrors, and light amplification devices.

"Solid consistency" refers to a material having, in the absence of externally applied constraints, the appearance of a solid. Solid consistency includes in a non-restrictive way the consistency of a pasty medium of very high viscosity, the consistency of a thixotropic fluid in the rest state, the consistency of a gel or a gelled medium and the consistency of a plastified polymer film. All such materials, when viewed without disturbance, appear solid.

"Film-forming" refers to forming a sheet of an existing mixture, which also includes other constituents.

"Initially water-soluble" refers to a material which is water-soluble before incorporation in electrolytic material or in a formative composition of electrolytic material. Once the electrolytic material is fabricated, the initial water-solubility of the resulting resin can be partially or totally, reversibly or irreversibly, lost. This loss of water-solubility may occur due to cross-linking by a cross-linking agent, for example.

"Layer" refers to a thin sheet or film of homogeneous, heterogeneous, or composite material having a large surface area with respect to its thickness and preferably having a substantially constant thickness. Such a layer can be simple or composite; a composite layer itself comprises several layers. Such a layer can be spread undivided, or the layer may be divided into portions.

"Small thickness" of a layer of electrolytic material refers to a thickness preferably between a few microns and a few tens of microns.

"Small thickness" of an electrode refers to a thickness preferably between a few hundred Angstroms and several hundred microns.

"Small thickness" of a modulating device refers preferably to between a few microns and a few hundred microns, including the thickness of a substrate.

"Homogeneous mixture" refers to a mixture whose constituents, on the macroscopic scale, cannot be distinguished from each other, having a structure appearing to be continuous.

"Alloy" refers to the association or combination of several types of different metals, whether a solid solution, an intermetallic compound, a juxtaposition of crystallites of each metal, or any other form of association or combination obtained by co-deposition of several metals.

DESCRIPTION OF THE PREFERRED EMBODIMENTS

As specifically shown in FIGS. 1A and 1B, it was first discovered that an elementary modulating cell 1 may be constructed by disposing a first electrode or working electrode 2 (which electrode 2 is electronically conductive, optically transparent) in contact with a face of at least one layer (or portion of a layer) of at least one electrolytic material 3. The material 3 preferably has a thickness between the order of a few microns or a few tens of microns, produced by a homogeneous mixture of solid consistency comprising:

a) a water-soluble salt or a water-soluble mixture of salts of at least one metal which can be cathodically deposited from an aqueous solution of one of its simple or complex ions;

b) at least one initially water-soluble film-forming polymer resin, preferably in the proportion of one part by weight to 0.05 to 50 parts of anhydrous salts; and c) water.

Such a cell further includes a second electrode or counter-electrode 4, in contact with the other face of the layer 3 electrolytic material.

Illuminating a picture element is accomplished by "writing" the element. The "writing" process comprises increasing the optical density of the interface region between the working electrode 2 and the layer of electrolytic material 3. It is possible to write a picture element 5 by applying to the working electrode 2 a negative electrical voltage of between a fraction of a volt to a few volts with respect to the counter-electrode 4 for a time interval having a certain duration. This time interval is referred to as the write phase, and the state of a cell during the write phase is illustrated in FIGS. 2A and 2B.

Further, it is possible to maintain an image point or image segment as written during a certain time while removing the applied electrical voltage. Such maintenance of optical density while eliminating the externally applied potential difference is referred to as the maintaining phase and is illustrated in FIGS. 3A and 3B.

It is also possible to maintain the image point or image segment in the written state for a duration longer than the maintenance state previously described, by applying a write voltage which is close to the electromotive force which the elementary cell may exhibit in the written state.

It is also possible to erase, either partially or totally, the increased optical density of a written picture element 5. Such erasure occurs during an "erase phase" and comprises reducing or eliminating the increase in optical density obtained during the previous write phase, by causing an electric current to flow between the electrodes 2, 4 in a direction opposite the direction of current flow applied in the write phase, as illustrated in FIGS. 4A and 4B.

Additionally, it is possible to maintain the picture element 5 in the erased state.

Finally, it is possible to repetitively restart the write, erase and maintaining phases.

In addition to the foregoing characteristics, the electrolytic material used in the elementary cell has the following further characteristics: ionic conductivity; plastic or viscoelastic deformability; and it can be conformed in a continuous layer of small thickness. Further, the electrolytic material not only participates in the writing or erasing of an image point or image segment. It can also enable the flow of electrical current between the working electrode and the counter-electrode during the writing and during the erasure, accomplishing this in the following ways:

(a) by the cathodic reduction of depositable metallic ions which are contained in the material, in combination with the working electrode (write phase);

(b) by anodic oxidation and re-incorporation into the original state of the metallic ions produced by this oxidation in combination with the working electrode (erase phase); and (c) by carrying in each direction electrical charges in ionic form between the working electrode and the counter-electrode in quantities equal to the electrical charges injected in electron form into the electrolytic material by the working electrode during writing, and to the electrical charges extracted in electron form from the electrolytic material by the working electrode during erasure.

An electrochromic light-modulating process implemented by the cell and the material thus described comprises the following steps:

(a) producing at least one such electrolytic material;

(b) producing at least one layer of at least one electrolytic material having a thickness of between a few microns and a few tens of microns;

(c) disposing the electrodes of the cell in contact with the faces of the layer of electrolytic material;

(d) during at least one write phase of a certain duration, applying an electrical potential negative with respect to that of the counter-electrode to the working electrode, thereby causing at least one image point or one image segment to be written; and (e) during at least one erase phase, after the write phase, passing an electrical current having a polarity opposite to that of the electrical current during the write phase, such that the picture element previously written is erased.

The process is repetitive and is able to comprise several pairs of write and erase steps.

Surprisingly, the written picture element 5 is on the one hand an area delimited by a remarkably sharp contour, corresponding to the intersection of the orthogonal projections, on the screen area of the cell, the areas corresponding to the areas of the two electrodes 2, 4 and of the layer of electrolytic material 3 between them. On the other hand, the picture element has a dark, matt and amorphous appearance, very different from that of a conventional metallic deposit. It appears clear, bright and crystalline, close to that of a metallic "black", and having the appearance of black printing ink, as described below.

For example, if the counter-electrode 4 has an area whose projection is included inside that of the working electrode 2 and of the layer of electrolytic material 3, the written picture element 5 exactly reproduces the shape of the counter-electrode 4, even though the written picture is formed at a certain distance from the counter-electrode. One does not observe any blurred or diffused contour, as could be expected.

Furthermore, the picture element 5, once written, does not diffuse beyond its contour and is not diluted by its undarkened surroundings. This characteristic is illustrated diagrammatically in FIG. 5. The obtaining, under such conditions, of a sharp contour of the written image point or image segment 5 is very important. Although it is in fact possible with known electrochromic processes to obtain picture elements with a sharp contour by delimiting the transparent electrode or the electrochromic material, in common cases in which the electrochromic material is a thin solid deposited layer on the transparent electrode, this delimitation, makes the manufacturing complex and expensive and reduces the resolution and the average contrast. This is true, particularly in the case of a so-called matrix display device which comprises a matrix of pixels placed at the intersections of a system of horizontal conductive rows and vertical conductive columns.

A delimitation of the contour of each picture element 5 which can be reduced to the intersection of the areas of a transparent electrode 2 and of a counter-electrode 4, both elongated and having directions generally perpendicular to each other, the electrolytic material 3 having an area covering at least this intersection. This delimitation lends itself to extremely simple construction and enables obtaining of picture elements 5 very small in size, as well as minimizing gaps between adjacent picture elements. This variant is represented diagrammatically in FIG. 9 in the particular case in which the electrolytic material 3 is in the form of strips which are coaxial with the counter-electrodes 4 and slightly and laterally overlapping the latter. This variant is intended for so called matrix display panels.

Surprisingly, the optical density of the picture element 5 is uniform inside its contour up to large sizes of this picture element, on the order of several square centimeters, without special precautions. Beyond this size, because of the resistivity of the working electrode 2, an appropriate geometry of the electrical current supply zones or points (that is, electrical current lead zones and 12, respectively, on the working electrode 2 and possibly on the counter-electrode 4) is necessary to ensure a sufficiently uniform current density in order to obtain a uniform optical density.

It is possible to obtain a coloring or densification of the picture element exhibiting by reflection a very high optical density (a printing ink or Indian ink black appearance), and a total opacity by transmission. But, surprisingly, it is also possible, by causing to flow an electrical charge which is smaller than that enabling the maximum optical density or complete opacity to be obtained, to obtain a lower uniform optical density. This lower uniform optical density is a grey coloring when viewed by reflection, and grey screen or filter uniformly reducing the transmission of light when viewed by transparency. More precisely, it is possible in both modes of vision (transmission and reflection) to produce, by varying the electrical write charge, a continuous grey scale going from the initial absence of coloring or optical density when viewed by reflection, or from initial transparency when viewed by transmission, respectively, to a high optical density, in particular a dense black or opacity. Obtaining of such a grey scale is important, particularly for the display of high quality graphical images.

In contrast, according to document FR 2,504,290, a mark obtained with a writing stylus is always very dense by reflection and opaque by transparency. The fact of varying the electrical charge when the writing stylus forming a cathode is immobile during the writing of a point, or of varying the current density when the stylus is moving for writing a line, has the sole effect of varying the diameter of the point or the width of the line. However, it does not affect its optical density as it does according to the present invention. It is possible to obtain, starting from the erased state, an increase in optical density with a duration of application of the electrical write phase voltage of only a few milliseconds, and a corresponding decrease with an erase phase duration of the same order of magnitude.

The writing process can be implemented in such a way as to exhibit a well-defined electrical voltage threshold of high value. That is, when applying an electrical write voltage less than this threshold to an elementary cell 1, the picture element 5 is not written. Such an electrical writing voltage threshold is essential for the multiplexed addressing of a matrix display device.

The erasure of the written picture element 5 is obtained by causing to flow in the elementary cell 1 a current of opposite direction to that of the write phase current. The erase phase current is generally obtained either by applying to the electrodes 2, 4 an electrical voltage of the opposite direction to that of the writing voltage; or, in the case in which the cell exhibits an electromotive force, by simple short circuiting.

The present modulation process enables, in a reversible and repetitive way, writing and erasing of image points or image segments, which is not foreseen in the document FR 2,504,290, referred to above.

A picture element 5 is written by cathodic reduction in the region of the interface between the working electrode 2 and the layer of electrolytic material 3. The cathodic reduction involves metallic ions present in the layer of electrolytic material 3 being reduced into a metal or metallic alloy which electrocrystallizes according to a particular mode having remarkable characteristics of optical density, uniformity, sharpness of contour, grey scale and absence of diffusion or dilution, and so forth, as described above.

Picture element 5 is erased by anodic oxidation of the metal or metallic alloy plate formed as described above. The electrolytic material is thus already characterized by enabling both the writing and erasure functions.

Surprisingly, it is observed that the metallic deposit formed in the interface region is capable of being redissolved by anodic oxidation, without a residual deposit remaining. The redissolution is also achieved without massive reinjection of metallic ions produced by this oxidation into the electrolytic material, thereby avoiding production of harmful or parasitic phenomena or processes (such as a flocculation or a local "salting out" of the film-forming polymer), as would have been expected.

The cathodic deposit of metal or alloy according to a particular mode of electrocrystallization observed, and its dissolution by anodic oxidation, is obtained with layers of electrolytic material containing (depending on the cases) a single metal or several metals chosen from most of the metals which can be cathodically deposited alone or co-deposited with several or which cannot be deposited alone but can be co-jointly deposited with others, from an aqueous solution of their simple or complex ions or a combination of them. In particular, the following metals are suitable: zinc, cadmium, lead, silver, copper, iron, cobalt, nickel, tin, indium, platinum, palladium, gold, bismuth, antimony, tellurium, manganese, thallium, selenium, gallium, arsenic, mercury, chromium, tungsten, molybdenum, associated with a large number of water soluble film forming polymer resins:. The actual crystalline structure of the developed metallic deposits, which appears interspersed in the network of the polymer resin, could be that of a highly divided state with regard to appearance and optical density. One of the hypotheses is that of a multi-dendritic growth along the molecular chains of the resin. However, the invention is not tied to the hypotheses and assumptions thus mentioned.

The present electrolytic material can contain (without disadvantage for obtaining of the optical densification of the picture element with the characteristics mentioned above and without disadvantage for its erasure), in addition to the already mentioned electro-depositable cations, cations of metals which cannot be electro-deposited from an aqueous solution in substantial proportions. This characteristic produces a greater flexibility in the formulation of electrolytic materials better responding to various individual application requirements.

In contrast, according to document FR 2,504,290, writing marks on the recording medium is inhibited and replaced by a metallic plate on the cathode comprising the writing electrode. And/or it is inhibited also by a release of hydrogen, when the layer of electrochromic material contains a considerable proportion of metal cations which cannot be electro-deposited from an aqueous solution, such as the alkali metals (with the exception of ammonium ion), the alkaline-earths in particular.

In the present material, the presence of a considerable quantity of metal cations which cannot be electro-deposited has no inhibiting effect. This could be associated in particular with the fact that the voltages necessary for writing are a maximum of a few volts (while according to the document FR 2,504,290, the voltages used are generally within a range from about a few volts to a few tens of volts).

A layer of the present electrolytic material is generally a continuous layer. That is, it is generally non-granular, and is transparent or substantially transparent. Depending on the nature of the ions which it contains, it can be colorless or colored.

In the case in which the elementary cell operates by transmission, in which case the counter-electrode is also a transparent electrode, the layer of electrolytic material is left in this transparent form or in a form which is substantially transparent or as slightly colored as possible. This is true unless it also constitutes a colored filter, for example, for producing variable transmission colored apertures or color display devices.

In the case in which the elementary cell operates solely by reflection, it is generally necessary to add to the layer of electrolytic material a masking and/or contrasting pigment compatible with the other constituents of the electrolytic material. Such a pigment has the effect of masking the counter-electrode if the latter does not constitute a background of satisfactory color and/or contrast, while attenuating a possible colored tint of the electrolytic material if such a coloring exists because of the composition and is not desirable, and of constituting a background providing the most desirable contrast with the black appearance of the written picture element. A white pigment such as titanium dioxide, particularly in the rutile and anatase crystalline forms, dispersed in particulate form in the layer of electrolytic material or in only a section of the thickness of this layer, enables attainment of a particularly white background. For the purpose of obtaining a particular colored background (which can be of particular interest for production of color display devices) it is possible to use colored pigments alone or mixed with a white pigment.

Surprisingly, the color of a colored pigment or of a dye present in the electrolytic material is progressively extinguished until it is practically black, without residual coloration, when the optical density of a picture element is progressively increased. Everything happens as if the reflected or transmitted colored light (depending on the case) were filtered by the neutral grey screen produced by the written image point or image segment. This remarkable feature enables the production of multi-color display devices by three-color additive synthesis using three electrolytic materials, each material colored according to one of the three primary colors.

The present electrolytic material can comprise, depending on the cases, the ions of a single metal or of several metals chosen among most of the metals which can be cathodically deposited alone or co-deposited with several. It is therefore possible, depending on the case, to change the conditions for obtaining the deposit of a single one of these metals and/or modify the write or erase features and/or modify the appearance of such a deposit, or obtain by cathodic reduction an alloy which can have an appearance and/or write or erase characteristics and/or features combining those of the individually deposited metals, but also have an appearance and/or characteristics and/or write and erase features which are completely new. This may be true, for example, with regard to "memory" (that is, non-volatility of memory, the persistence of the coloring, densification or opacification of the picture element in the absence of electrical voltage applied to the elementary cell).

According to a preferred embodiment of the electrolytic material, the water-soluble metallic salt or water-soluble mixture of metallic salts is hygroscopic and preferably deliquescent in the presence of atmospheric humidity. According to this preferred embodiment, a layer or film of electrolytic material having a thickness of between a few microns and a few tens of microns not enclosed in a sealed enclosure permanently retains (down to a very low atmospheric humidity) a high ionic electrical conductivity which enables the elementary modulating cell to be operated with a minimum voltage of a few volts. This high ionic electrical conductivity is due to the fact that, with hygroscopic salts, the layer of electrolytic material, although having the appearance and solid consistency of a dry layer, retains a certain quantity of water in equilibrium with atmospheric humidity. This internal water, in which the metallic salts are dissolved in very high concentration, provides the layer of electrolytic material with considerable ionic conductivity. The ionic conductivity varies with atmospheric humidity, but remains high down to its very lower levels of water content. It retains a conductivity value which depends on the degree of hygroscopicity or deliquescence of the chosen combination of salts.

According to this preferred embodiment of the composition of the electrolytic material, it is possible to avoid sealing the light-modulating elementary cell in a strictly leak-tight way, unlike most known electrochromic display devices. This avoidance of leak-tight sealing represents a considerable simplification in manufacture of the cell or of the device, and provides a reduction in cost.

In fact, it is possible to tolerate the effects of a penetration of atmospheric humidity into the cell and the effects of a loss of water contained in the layer of electrolytic material to a very large degree. Surprisingly, it is also possible to tolerate the effect of a penetration of atmospheric oxygen into the cell. It could have been feared that, during the operation of an elementary light-modulating cell which is not sealed strictly leak-tight, variations in relative atmospheric humidity which can give rise to variations in the water content of the electrolytic material, could produce significant variations of impedance of the elementary cells, thus giving rise to corresponding fluctuations in the electro-optical characteristics.

But, in fact, everything happens as if, with the thicknesses considered for the layer of electrolytic material, the impedance variations due to variations in the resistivity of the electrolytic material were, over a wide range of variation of the latter, secondary with respect to the overall impedance of the cell. The impedance, like other factors contributing to the impedance of the cell, comprises multiple polarizations corresponding to various electrochemical processes occurring at each electrode (in particular electrochemical activation polarizations, concentration polarizations). In any case, it is possible to compensate for a substantial variation in the overall impedance of the cell by modifying the electrical writing voltage.

A protective insulation of the cell or of the device is desirable or even necessary when the light-modulating cell is operated in extreme and/or aggressive and/or corrosive atmospheric environments, for the purpose of limiting or preventing components of the cell or device from coming into contact with the external medium. But the effect on the structure, manufacture and cost is very different from that of having to provide each cell, group of cells or device with strictly leak-tight sealing or protection which is capable of providing and retaining a strictly leak-tight protective insulation despite the thermal or mechanical stresses to which the cell or device may be submitted.

A layer of the present electrolytic material which has a solid consistency in the absence of externally applied stresses, has, under the effect of such stresses, a plastic or viscoelastic behavior. The electrolytic material's characteristics depend particularly on the nature of the polymer resin and the degree of cross-linking.

This plastic or viscoelastic behavior is very important. On the one hand, it enables the layer of electrolytic material to be shaped to compensate for defects in the flatness of one or both of the electrodes, and to compensate for defects in parallelism between the two electrodes. This behavior thus provides an excellent physical and electrical contact, despite these defects.

On the other hand, at the interface between the working electrode or counter-electrode and the layer of electrolytic material, the electrolytic material remains connected. A good physical and electrical contact remains assured even if overall or local strain affects the cell or light-modulating device, due to compliance of the electrolytic material.

Furthermore, this plastic or viscoelastic behavior increases "lifetime"; that is, the number of accessible write-erase cycles. It is known that the write and erase reactions of an electrochromic device produce local stresses and strains due to morphological changes associated with these electrochemical reactions. At the interface of two solids which can both present only elastic distortions under the considered conditions (particularly fragile solids), even small strains can give rise to high stresses whose cyclic repetition is capable of altering the quality of the contact (especially of the electrical contact). It is also capable of reducing the lifetime of the device.

This disadvantage of known electrochromic devices where the electrochromic material (and in certain cases the electrolyte) are fragile solids, does not affect devices made in accordance with the present invention. The quality of the contact is maintained at the interface of each working electrode (or counter-electrode) and the layer of electrolytic material. Quality of contact is maintained because of the compliance of at least one of these solids.

The above-mentioned physical properties of the electrolytic material enable a considerable simplification of the construction of a light-modulating cell or device, and a reduction in requirements relating to the constitutive materials and components. The properties also enable production of very large display panels. In fact, it is not necessary to provide a specific spacer intended to maintain a strict parallelism and an accurate spacing between the working electrode and the counter-electrode. A layer of electrolytic material deposited by industrial application or known coating techniques generally (such as air gap, coating bar, scraper, exclusion, calendaring and silk screening, for example) suffices to constitute the spacer and to define a sufficiently accurate spacing.

The substrate of the transparent working electrodes can be, without disadvantage, for example, a plate of drawn glass. Very large-area display panels (comprising a multiplicity of elementary display cells) can be constructed; yet the strains (mechanical, thermal, vibratory) to which large areas are likely to be subjected do not have a harmful effect on the physical integrity and functioning of these elementary display cells.

By an appropriate choice of the film-forming water-soluble polymer resin, and taking into account other composition factors, the present electrolytic material has adhesive properties. More specifically, the electrolytic material has a sticky touch (known by the expression "tack") or contact adhesion (known by the expression "pressure-sensitive adhesion"). Such resins can be (in particular nonlimiting examples) hydroxyethylcellulose, polyvinylpyrrol idone, polyvinyl alcohol, or equivalents.

In the presence of a high concentration of a contrasting pigment, or in the case of the use of a water-soluble polymer resin which does not produce this tack, or when the polymer resin is strongly cross-linked in the electrolytic material, the surface adhesion can be greatly reduced or non-existent. In these cases, the layer of electrolytic material advantageously comprises a composite with three superimposed layers. Two external layers of the three are formulated by means of an appropriate resin, and contain neither a cross-linking agent nor contrasting pigment, or sufficiently little not to affect the tack; the internal layer 7 is able to be deprived of this tack (FIG. 6).

The existence of such a tack or surface adhesion also enables simplification of the manufacture of light-modulating cells and devices. In fact, the mechanical cohesion of each cell can be maintained solely by the pressure-sensitive adhesion properties of the layer of electrolytic material; the material adheres both to the working electrode and to the counter-electrode so that it is unnecessary to provide additional external mechanical means to support the cell.

Furthermore, the adhesion of the electrolytic material to the two electrodes (working electrode and counter-electrode) provides an excellent physical and electrical contact of the electronic conductor and the ionic conductor at each interface. It is thus unnecessary to apply and maintain a pressure on the cell, or to provide mechanical means for this purpose.

The combination of such a pressure-sensitive adhesion and the plastic or viscoelastic deformability already mentioned enables the production of large-sized display panels which can have a very simple structure and which are not affected by thermal and mechanical strains and vibrations to which such panels can be subjected.

In the functioning of an elementary electrochromic cell, there occurs at the counter-electrode an electrochemical reaction corresponding to that which occurs at the working electrode. One electrochemical reaction is an anodic oxidation if the other is a cathodic reduction, and vice-versa. There must therefore exist at the counter-electrode an auxiliary redox couple capable of reversibly changing from one of its terms to the other by electrochemical oxido-reduction. In the absence of such a reversible auxiliary redox couple, the oxidation and reduction at the counter-electrode can lead to degradation of the constituent materials of the cell and/or to generation of gaseous species which interfere with operation.

The present electrolytic material already intrinsically contains at least a first auxiliary redox couple which is precisely the redox couple which is implemented at the working electrode: the metallic ion(s)-metal or alloy couple. However, prior to operation of the cell, the same term of the couple is present at the working electrode and at the counter-electrode, while operation requires the presence of conjugated terms. It suffices, for example, to initially apply a sufficient voltage for a few seconds in order to create the necessary asymmetry for the cell to function correctly: everything functions as if the cell always contained a sufficient quantity of electroactive oxidizable species to enable such an asymmetry without damage.

An auxiliary redox couple of this type enables a satisfactory functioning by reflection if there is incorporated in the electrolytic material a masking pigment which conceals the counter-electrode. In functioning by transmission (with an electrolytic material and a counter-electrode which are kept transparent), erasure of the visible deposit on one of the electrodes is accompanied by the formation of a visible deposit on the other electrode, and the maximum transmission of the cell is reduced.

The present electrolytic material can also contain, intrinsically, a second auxiliary redox couple whose reduced form is on the one hand water-soluble in the presence of other water-soluble constituents of the material and, on the other hand, colorless or only slightly colored at the concentrations used. An auxiliary redox pair of this type enables a satisfactory functioning both in transmission and in reflection, avoiding in transmission the disadvantage mentioned above.

The intrinsic presence of this second auxiliary redox pair in the electrolytic material can have two origins. A first origin is when a simple or complex metallic ion which is cathodically reducible to metal (introduced as such into the electrolytic material) can also reversibly change to a higher degree of oxidation. This is the case, among others, of lead, silver, copper, iron, mercury and tin in particular. For example, Cu(I), Fe(II), introduced to respectively create the electrochromic processes Cu(I)⟷Cu(II), Fe(II)⟷Fe(O)

create at the same time the auxiliary redox pairs

CU(I)⟷CU(II) and Fe(II)⟷Fe(III).

A second origin or the intrinsic presence of a second auxiliary redox pair in the electrolytic material is when one of the anions of the water-soluble mixture of salts of the electrolytic material can reversibly switch to a higher degree of oxidation. This is particularly the case of the halide anions. For example, the presence of the chloride or bromide anion creates same time as the auxiliary redox couples such as 2Cl⁻⟷Cl₂, 3Br⟷Br₃⁻.

It is also possible to introduce extrinsically into the present electrolytic material (if it does not contain it intrinsically) an auxiliary redox couple of the previous type. That is, an auxiliary redox couple whose reduced form is water-soluble in the presence of other water-soluble constituents of the material, and colorless or only slightly colored in the concentrations used.

Presence of such an auxiliary redox couple in the electrolytic material corresponds to a preferred composition of the electrolytic material which is particularly advantageous. In fact, it is found that it suffices for the counter-electrode to have simple electronic conduction properties (and optical transparency properties if the cell is intended to function by transmission), unlike the counter-electrodes of complex composition and structure of many known electrochromic devices. Numerous materials, particularly commercially available materials, can thus be directly suitable as counter-electrode materials.

Finally, the electrolytic material can be associated with a counter-electrode itself having redox properties. For example, a counter-electrode may be formed from a metal which can be anodically oxidizable in a reversible way. One example is lead corresponding with the redox pair:

Pb⟷PbO₂

Or, a counter-electrode may be formed, covered with a layer of an oxide or solid compound capable of reversibly changing between two different degrees of oxidation.

The present electrolytic material may be a continuous material (that is, not granular), is transparent, can be made contrasting and opaque in its mass, is of solid consistency, has plastic or viscoelastic deformability, has permanent ionic conductivity which it is furthermore capable of retaining even if it is exposed to the atmosphere, and is also capable of exhibiting a pressure-sensitive adhesion. The material, when conformed in a layer or thin film, preferably has a thickness of from a few microns to a few tens of microns. The material is placed in contact with a first (or working) transparent electrode on one side, and with a second electrode (or counter-electrode) on the opposite side.

The material constitutes and comprises the following: the electrochromic material, the electrolyte, and an auxiliary redox couple of the light-modulating cell thus constituted, possibly a spacer, a means of cohesion for the cell, and a means for maintaining internal electrical contacts.

As an electrochromic material, it is capable of undergoing (at the interface with the transparent working electrodes) a reversible change of the degree of oxidation accompanied by a reversible change of coloring and/or optical density. By cathodic reduction, a metal or a metal alloy is formed at the interface, thus appearing as a darkening or opacification constituting a picture element having a remarkable set of characteristics. By anodic oxidation, the metal or alloy is redissolved into metallic ions, thus restoring the initial appearance of the medium.

As an electrolyte, it has a high ionic conductivity due to its very concentrated aqueous solution nature, a conductivity which it retains permanently even without strictly leak-tight sealing in a preferred embodiment.

As an auxiliary redox couple, it allows an electrochemical reaction to take place reversibly at the counter-electrode. This reaction is the conjugate of that which occurs at the same time at the working electrode.

Such an electrolytic material comprises a homogeneous mixture of solid consistency comprising:

a) at least a water-soluble salt (or a water-soluble mixture of salts) of at least one metal which can be cathodically deposited from an aqueous solution of one of its simple or complex ions;

b) at least one initially water-soluble film-forming polymer resin, preferably in the proportion of one part by weight to 0.05 to 50 parts of anhydrous salts; and c) water.

The electrolytic material may additionally comprise, as necessary, the following items (to which the inventive material is not to be limited): at least one additional redox couple; cations which cannot be electrodeposited in aqueous solution; at least one solid in dispersed particulate form (in particular a contrasting and/or masking pigment); at least one coloring agent; at least one acid; at least one cross-linking agent; at least one complexing agent; at least one dissolved or dispersed additive capable of improving the properties and use of the electrolytic material; and at least one agent for the formation and/or application as a layer or film of the electrolytic material.

According to a variant embodiment, the layers (or films) of electrolytic material can be divided into at least two superimposed or interleaved layers, each containing a different percentage of each constituent.

According to another variant embodiment, it is possible to fabricate a layer or film of composite material by superimposition or inter-leaving of at least two different electrolytic materials. For example, it can be advantageous to fabricate a composite layer comprising a nonadhesive film but mechanically very solid, comprising, for example, a resin such as sodium carboxymethylcellulose cross-linked in the film, and one or two external layers which are less mechanically solid but have pressure-sensitive adhesion, comprising, for example, polyvinyl polyvinylpyrrolidone or hydroxyethylcellulose.

According to another variant, the material comprises at least two electrolytic materials, each as previously defined.

The materials which can be used have been described above. It is possible to use, depending on the case, a single metal or several metals chosen from the metals which can be cathodically deposited from an aqueous solution, and metals which individually do not deposit or deposit poorly, but which co-deposit with certain of the previous metals: tungsten and molybdenum in particular.

The metallic salts which can be used are ionic compounds in which the metal is present in cationic form or incorporated in a cationic complex; the anions of these compounds, and other conditions (particularly the pH), are chosen such that the compounds are substantially completely soluble in an aqueous medium.

Appropriate anions could be found, for example, among the following: chloride, nitrate, sulphate, borate, fluoride, iodide, bromide, fluoroborate, fluorosilicate, fluorogallate, dihydrogenophosphate, chlorate, perchlorate, bromate, selenate, thiosulfate, thiocyanate, formiate, acetate, butyrate, hexanoate, adipate, citrate, lactate, oleate, oxalate, propionate, salicylate, glycinate, glycocollate, glycerophosphate, tartrate, acetyl-acetonate, isopropylate, benzoate, malate, benzene sulphonate, 1-phenol-4-sulphonate, in particular.

The salts which can be used can also be ionic compounds in which the metal forms an outer orbital complex anion associated with a cation (such as, for example, the ammonium ion). Examples of such anionic complexes are the chloropalladate ion, the chloraurate ion, and the stannate ion, in particular.

Regarding the preparation of the materials containing a salt or a mixture of hygroscopic and preferably deliquescent salts, most of the metals have some of their salts which are hygroscopic or deliquescent, most of them halides, nitrates, perchlorates, chlorates and thiocyanates, in particular.

A deliquescent mixture of salts is generally obtained from individually deliquescent salts, but mixtures can be deliquescent without their constituents being deliquescent themselves. The mixture can be more deliquescent (that is, crystallize at a lower relative humidity) than the most deliquescent of the constituents.

The presence of halide anions (chloride, bromide, iodide, fluoride) in the electrolytic material is found to be particularly advantageous, when such a presence is compatible with the other constituents of the material and the expected properties. It is found, in fact, that the presence of halide anions is often advantageous with particular regard to deliquescence, auxiliary redox function, solubility of metallic ions, ease of electrodeposition and re-dissolution of the metal or metal alloy, and reversibility of the write-erase process.

Use in the material of an association of salts of various depositable metals offers wider possibilities than the use of a single metal.

First, certain metallic salts which cannot be used (or which are difficult to use alone) in relatively high concentration become easy to use in a low-concentration mixture with others, where their specific limitations (for example, solubility, coloring, and so forth) become acceptable or inapparent.

It is also possible to change, in certain cases, the conditions in which an electro-depositable cation is deposited, and/or to modify the write and erase features and/or the appearance by the presence of other cations.

Finally, by association of several different metallic ions, it is possible to obtain, by cathodic reduction, deposition of at least two metals as an alloy whose properties, appearance, optical density and reflection can be completely different from those of the individual metals. It is thus possible to obtain new and multiple write and erase features. In particular, new features include those regarding memory (that is, "nonvolatility," or persistence of the written picture element after removal of the writing voltage), existence and value of a voltage threshold (that is, a minimum writing voltage), and more generally of various non-linear characteristics which are particularly advantageous for matrix addressing without loss of contrast nor cross-talk of display devices comprising a large number of picture elements.

In the electrolytic material, it is found that the presence of copper ions (even in very low relative concentration) in association with other metallic ions is particularly advantageous with particular regard to ease of electrodeposition and re-dissolution, reversibility of the write-erase process, and the appearance of the deposit.

It has been unexpectedly found that a high ratio of water-soluble (anhydrous) salts to the water contained in the electrolytic material (preferably higher than 0.05, and more preferably even higher than 1) had a favorable effect on various operating characteristics of the cell. Particularly, favorable effects were observed with respect to appearance and optical density of the written picture elements, polarizations and reversibility.

Usable initially water-soluble film-forming polymer resins comprise resins capable of forming actual aqueous solutions. Also, resins capable of forming a colloidal dispersion in water are usable. It is possible to quote (by way of non-limitative and purely indicative examples) polymers such as polyoxyethylene, polyvinylpyrrolidone, polyvinyl alcohol, the cellulosic ethers such as, for example, hydroxyethylcellulose and carboxymethyl cellulose, sodium alginate, polyacrylic acid and its derivatives, gelatin, gum arabic, polystyrene sulfonic acid, polyacrylamide, in particular several resins which are compatible with each other (that is, which are not coprecipitant) which can be used in a mixture.

Preferably, the molecular weight of the resins is between 10,000 and 10,000,000. The mechanical qualities of the layer of electrolytic material can be improved, as far as desired, with a resin having a molecular weight located in the upper section of the indicated range (towards 10,000,000). The polymer resin, in addition to its functions in the layer of electrolytic material, provides the material or fluid formative composition with a viscosity which facilitates application in thin layers, a viscosity which can be adjusted in various ways. In particular, it is possible to use polymer resins which provide the electrolytic material with pressure-sensitive adhesion properties (tack or contact adhesion), such as (for example, in a non-limitative and purely indicative way) hydroxyethylcellulose, polyvinyl alcohol and polyvinylpyrrolidone, either for constituting a single layer or film, or for constituting at least one external layer of a composite film.

The quantity of water is such that, on the one hand, the electrolytic material retains its solid consistency in the absence of external stresses, and on the other hand its ratio to the water-soluble salts is as has been mentioned above.

The cations of metals which are not electro-depositable from an aqueous solution can be chosen (in a non limiting and purely indicative way) from the alkali metals, the alkaline-earths, aluminum, beryllium, most of the rare earths and, in general, the cations of highly reducing metals which cannot be electro-deposited in aqueous solution. They also comprise the cations non-reducible into a metal such as, for example, the ammonium ion, the quaternary ammonium ions in particular.

The water soluble salts of these cations must be understood as water-soluble in the presence of other water-soluble salts of the material. That is, they may be chosen such that the mixture of all of the salts present in the material is water-soluble.

It was unexpectedly found that one or more solids could be homogeneously dispersed in the electrolytic material in particulate form for, in particular, improving or modifying mechanical properties, appearance of the written picture element, diffusion, and reflection of light. In particular, such a solid is a masking and/or a contrasting pigment having certain functions. The functions include masking the counter-electrode if the counter-electrode does not constitute a background of satisfactory color and/or contrast, functioning as a background providing the most desirable contrast with the black appearance of the written picture element (for example, masking the black appearance of a counter-electrode containing carbon and substituting for it a contrasting background, most often white), attenuating a possible colored parasitic tint of the electrolytic material by swamping it. Further functions include creating a particular colored contrasting background for producing colored light-modulating devices, especially for creating three-colored backgrounds, each according to the three primary colors of an additive three-color synthesis process for producing multi-color display devices.

Numerous inorganic and organic white and colored pigments can be used, provided that they do not interact chemically with the other constituents of the electrolytic material. Titanium dioxide, principally in the rutile and anatase crystalline forms, is a white pigment which is remarkably stable in most of the present electrolytic media, as it has a very high hiding power and a high whiteness index. This titanium dioxide pigment can be used in conjunction with a colored pigment, in a mixture, or by superimposition in a composite layer of electrolytic material, so as to enable modification of the saturation of the color and/or advantage to be taken of its high hiding power for a colored background. Such colored pigments are, for example, zinc chromate, minium, cobalt blue, and chromium oxide. It is similarly possible to associate titanium dioxide and a soluble dye. According to the nature of the pigment, its particle size, color, hiding power, and the desired effects, the ratio of pigment dispersed in the electrolytic material can vary between wide limits, preferably between 0.1 and 50 parts by weight of pigment for one part of film-forming polymer resin.

If necessary or desired, in the case of a light-modulating cell functioning by way of transmission, the electrolytic material can comprise one or more dissolved or dispersed dyes, for the purpose of producing colored transmission filters of variable transparency. This composition may be used for modulating devices such as colored transmission apertures, variable transparency apertures, and/or colored display devices. More particularly, it may be used for producing three filters, each colored according to one of the primary colors of the additive three-color synthesis system, for multi-color display devices. Numerous colorants, particularly of the type used for gouaches and water colors, can be used, provided they have no chemical interaction with the other constituents of the electrolytic material.

As mentioned above, the electrolytic material can comprise, if necessary, one or two additional auxiliary redox couples whose reduced form is on the one hand water-soluble in the presence of the other water-soluble constituents of the material and, on the other hand, colorless or slightly colored at the concentrations used; the electrolytic material has the functions of modifying the writing voltage threshold, improving reversibility of the write-erase process, and increasing the number of write-erase cycles. It is possible, for example, to use metallic species having two degrees of oxidation, whose reduced form is soluble (or can be made soluble, for example, by complexing in an aqueous medium).

The electrolytic material can further comprise an acid in sufficient quantity for maintaining the pH at a suitable value, and preventing hydrolysis and/or precipitation of the metallic species present and/or gelling or syneresis or flocculation of the resin in the electrolytic material. For example, it is possible to use (in a non-limitative and purely indicative way) hydrochloric acid, hydrobromic acid, acetic acid, perchloric acid, chloric acid, formic acid, nitric acid, or an equivalent.

The electrolytic material can further comprise a cross-linking agent for the polymer resin. Inclusion of a cross-linking agent may be used for strengthening the electrolytic material's mechanical qualities, particularly hardness and cohesion. For this purpose, it is possible to use the usual cross-linking agents for polymer resins, such as polyfunctional resins and compounds (for example, glyoxal, dimethylolurea, epoxy compounds, carbodiimide, isoxazole and dialdehyde starch in particular).

It is also possible in the case of resins containing, for example, carboxylic groups (like sodium carboxymethylcellulose), to use depositable polyvalent cations like Zr(IV), Sn(IV), and Al(III), in particular. In the case of Al(III), for example, the cation weight can preferably vary between 0.01 and 0.5 parts per one part of resin. With numerous polyvalent metallic ions usable according to the invention, cross-linking is obtained spontaneously without it being necessary to add an additional reticulating agent. The conditions for using the cross-linking agent are chosen in such a way that the cross-linking is performed after fabrication and application of the layer of electrolytic material.

For example, with a polyvalent cation, a sufficiently weak concentration associated with the presence of a volatile acid prevents substantial cross-linking as long as the acid has not been eliminated by evaporation. The cross-linking of the resin reduces contact adhesion capacity of the layer of electrolytic material. According to a preferred structure of the layer of electrolytic material, a cross-linked layer, mechanically solid and coherent but non-adhesive, is associated with one or two external layers which are less solid but adhesive and fabricated to comprise a suitable non-cross-linked resin.

The electrolytic material can further comprise a complexing agent (such as, for example, tartaric acid, citric acid, the oxalate anion) which can assist in solubilizing of certain metallic salts and/or facilitating co-deposition of several ions into a metallic alloy.

The electrolytic material can further comprise one or more compounds, substances, dissolved or dispersed constituents which are capable of improving various characteristics. The characteristics which can be improved thereby include stability of the electrolyte material and/or its optical, mechanical and electrical properties, and/or the appearance and/or other characteristics of picture elements, reversibility of the write-erase process, number of accessible cycles without degradation, writing and erase speeds, "memory" (or, nonvolatility of the writing), electrical writing threshold voltage and the electro-optical characteristics.

The electrolytic material can further comprise one or more agents for application in a layer of small thickness of the electrolytic material. The agents may be, for example, surface-active agents, plastifying substances in particular.

The electrolytic material can possibly include residues of preparation, application or conservation agents belonging to a particular method of manufacture or application as a layer or film on the electrolytic material or of a formative composition of the electrolytic material.

A particular preferred process for the manufacture of the electrolytic material and its use as layers or films of small thickness in elementary light-modulating cells comprises the non-limiting steps of fabricating a fluid formative composition comprising at least the constituents of the electrolytic material and additional water (the latter in a quantity such that the fluid formative composition has an appropriate fluidity for the application or formation in a layer on at least one of the electrodes of an elementary light-modulating cell), and possibly processing (in particular drying, heat treatment) until a solid consistency is obtained.

"Fluid formative composition" is understood to mean a composition having the properties of a fluid material (either spontaneously, or under the effect of externally applied stresses such as those necessary for its application in a layer). It may be possible to fabricate the electrolytic material in its solid consistency spontaneously by interruption of the external stresses, by evaporation of an excess of water and/or of volatile substances, or by induction of a solid consistency by various means and processes. The fluid formative composition also comprises the electrolytic material in its final composition as long as it remains deformable without rupture in a continuous way in the presence of externally applied stresses.

A fluid formative composition of the electrolytic material is obtained by dissolution of water-soluble constituents and dispersion of constituents which are not soluble in water. This dispersion and/or dissolution may possibly be followed by evaporation of part of this water (or by dilution by means of an adding water until the appropriate viscosity is obtained).

The formative composition can also contain substances intended to facilitate its application or formation in a layer, such as, for example, surface-active agents and plastifying substances. It can also contain substances intended to maintain stability of the formative composition and/or enable its continuous deformability (that is, without rupture). For example, in the presence of a cross-linking agent intended to cross-link the resin in the layer of electrolytic material, the fluid formative composition can contain cross-linking retarding agents, such as, in a non-limiting example, complexing agents. To prevent the hydrolysis of the soluble salts in the case of high dilution, it can, for example, contain acids, in particular volatile acids.

Such substances can be partially or totally eliminated from the layer of electrolytic material, for example, by evaporation if they are volatile. Or, on the contrary, they may remain in the layer of the material.

A remarkable characteristic of this possible mode of manufacture of the electrolytic material is that it allows a convenient adjustment of the viscosity of the formative composition over a wide range, from that of a liquid similar to water to that of a solid paste in the absence of external stresses. It is also possible to adjust the viscosity to a convenient value for the chosen mode of application or formation in a layer of small thickness. The mode of application or formation can be chosen from known techniques of application or formation in layers, such as silk screening, air gap, helical wire bar (known as "coating bar"), scraper, extrusion and immersion in particular, and, more generally, all of the so-called "thick film" techniques.

The formative composition is applied in a layer which is preferably between a few microns and a few hundreds of microns thick, depending in particular on its water content, in order to obtain a layer of electrolytic material. The layer of electrolytic material is of a thickness preferably between a few microns and a few tens of microns, and is disposed over at least one of the electrodes of the elementary light-modulating cell. It is possibly dried (by hot air, infra-red, and exposure to the ambient atmosphere in particular) until a material of solid consistency is obtained in its final composition. It can also be subject, possibly, to additional processing. For example, a heat treatment may be applied in order to obtain or accelerate cross-linking of the resin.

The layer of electrolytic material can be used in elementary light-modulating cells by applying or forming this layer in contact with one of the electrodes, followed by applying the other electrode to the free face of the layer (FIG. 7A). With the preferred method of producing the electrolytic material which provides it with a tack or pressure-sensitive adhesion or superficial adhesion, the cohesion of the cell is provided by simple adherence of the layer of electrolytic material to each of the two electrodes. In addition to the adhesion procured by the surface adhesion or the pressure-sensitive adhesion of the electrolytic material (and even in its absence), the direct formation of the material in a layer on a substrate (such as one of the electrodes) from a fluid formative composition which is spread and then dried can provide a natural adherence to this substrate. This natural adherence can be much stronger than that of a layer of material which is first formed independently and then subsequently made to adhere.

The fluid formative composition can be spread or applied to an electrode in a single layer or in several consecutive layers with intermediate or simultaneous dryings. The different layers can be identical to each other, but it is also possible to fabricate each layer with a different percentage of the total constituents, all of the layers containing them all.

It is also possible to apply consecutive layers of electrolytic material having different compositions. In this way, a layer of electrolytic material having a composite structure is obtained. For example, it is possible to fabricate a lower layer (that is, directly applied to the substrate) with a water-soluble resin which is easily cross-linked. Such resins may be, for example, sodium carboxymethylcellulose (and a reticulation agent). It is possible to fabricate the upper layer with a resin providing a tack or a pressure-sensitive adhesion (such as, for example, hydroxyethylcellulose, polyvinylpyrrolidone, polyvinyl alcohol, and so forth).

The composite layer of electrolytic material thus formed adheres to the electrode on which it has been formed, has high solidity, and exhibits a pressure-sensitive adhesion which enables (in a possible mode of construction of the elementary modulating cell) construction of the cell by applying the second electrode to the free adhesive surface of the composite layer to which it adheres. It is also possible to apply a first layer (simple or composite) of electrolytic material to one of the electrodes, and to apply a second layer (simple or composite) to the second electrode, and to fabricate the elementary cell by joining of the two layers into a single composite layer by placing the two layers in contact with each other by their free faces. With at least one of the two layers formed according to the mode which provides a pressure-sensitive adhesion or tack, the cohesion of the cell is ensured solely by the adherence of the layers of materials to the electrodes and to each other.

Instead of fabricating continuous layers with the electrolytic material, it is also possible to divide it into granules or particles and to construct the layers by juxtaposition of such granules, either alone or maintained, for example, by means of a binder.

In an independent device which is mainly a display device comprising a multiplicity of picture elements, the layer of electrolytic material can, in certain constructions, be common to all of the elementary cells and occupy the entire surface of the screen. In other constructions of the device, it can be distributed according to a surface pattern of portions of layer. That is, it may be divided into portions of a layer or layers of reduced area, the areas being independent and distributed over the screen, each belonging to an elementary cell or to a particular restricted group of elementary cells (for example, common to the cells of a same row or column in a matrix display device). Obtaining such patterns with high resolutions is particularly easy with the present method of manufacturing layers of electrolytic material, in particular because of the mask, stencil and silk screen techniques used in depositing processes known as "thick film" processes.

It is also possible, in a variant of the process, to construct the layer of electrolytic material on a temporary substrate constructed from a non-adhering material such as polytetrafluoroethylene, and then transfer it to one of the two electrodes.

A light-modulating cell comprises at least, in combination:

1) a first "working" electrode which is transparent or substantially transparent and electronically conducting;

2) a second "counter-electrode" separated transversely from the working electrode and electronically conductive;

3) at least one layer (or portion of a layer) of the previously described electrolytic material, interposed between the two electrodes and in contact with them in the region of a picture element; and 4) electrical connection zones for leading electrical current to the working electrode and to the counter-electrode, capable of enabling (on the one hand) application to the working electrode of a negative electrical voltage with respect to that of the counter-electrode, and (on the other hand) allowing passage between the electrodes of a current whose direction is opposite to that of the electrical current resulting from the application of the previous voltage.

An elementary light-modulating device comprises at least:

1) a first "working" electrode which is transparent or substantially transparent and electronically conductive, possibly supported by a transparent first substrate or front substrate;

2) a second "counter-electrode" or auxiliary electrode transversely separated from the working electrode and electronically conductive, transparent or substantially transparent if the elementary device is intended to function by transmission but without requiring transparency if the elementary device is intended only to function by reflection, possibly supported by a second transparent substrate if the elementary device is intended to function by transmission;

3) at least one layer (or portion of a layer) of electrolytic material such as previously described, interposed between the two electrodes and in contact with them in the region of a picture element;

4) electrical connection zones for leading electrical current to the electrodes (that is, elements 1, 2, 3, 4 comprise a modulating cell);

5) electrical current leads in contact with the electrical connection zones;

6) electrical connections extending the current leads; and 7) at least one mechanical substrate to support the device.

An elementary device can further comprise means of contrasting and/or masking the periphery of the optically densifiable zone (picture element), if these means are not already intrinsically created by the components of the elementary device. An elementary device can also comprise means of insulating and protecting the components from ambient atmosphere, and/or means for maintaining the device's cohesion and/or of the permanence of its internal electrical contacts.

An independent light-modulating device comprises at least one such elementary device and, generally, may comprise a plurality of them (particularly in the case of a display device). Adding extensions or one or more connectors (or one or more electrical connection zones) to the elementary devices and adding mechanical supporting means provide the device with structural rigidity, the whole assembly enabling use of this device as an independent unit.

The complementary components of the independent device are in particular: mechanical supports or substrates, casing, encapsulation, internal connections, connector(s) or connection zone(s), and printed circuit boards, as already described. In the particular case of an independent device comprising a plurality or multiplicity of elementary devices, the extrinsic components or constituents of the different elementary devices can be merged and/or combined.

Such an independent light-modulating device, in particular a display device, comprises only solid materials as a consequence of the previously explained properties of the electrolytic material. It has a remarkable simplicity of structure and construction, with reduced requirements with regard to constituent materials and components, and a very wide tolerance with respect to external stresses. This enables simple and inexpensive construction of light-modulating devices and, in particular, of various display devices with direct or matrix addressing, especially very large display panels (such as, for example, for stadiums, airports, and so forth).

In fact, it is not necessary to maintain a strict parallelism and an accurate spacing between the electrode and the counter-electrode of an elementary display device. Consequently it is unnecessary to provide a specific spacer; a layer of electrolytic material such as deposited by the known industrial techniques of coating or application suffices to fabricate the spacer and to define a separation of sufficient accuracy and parallelism.

It is no longer necessary to use a working electrode and a counter-electrode having perfect flatness. The deformability, or plastic or viscoelastic compliance, of the electrolytic material enables it to closely follow a general curvature if it exists, as well as following local defects. This ensures excellent physical and electrical contact necessary for functioning. For example, it is thus that transparent electrodes deposited on an ordinary drawn glass plate are suitable for producing display devices.

It is no longer necessary, with the present electrolytic material (which provides a tack or a pressure-sensitive adhesion) to provide specific mechanical means for maintaining the cohesion of the elementary display cell.

Nor is it necessary to provide specific mechanical means for applying and maintaining a pressure on the cell for providing and conserving excellent physical and electrical contact necessary at each interface between the electronic conductor and ionic conductor, for correct functioning. The adherence of the layer of electrolytic material to each electrode suffices to maintain cohesion of the elementary cell and the quality and permanence of the electrical contact.

Finally, with the method of producing the electrolytic material which enables it to maintain permanent conductivity even when in contact with the ambient atmosphere, it is not necessary to provide strictly leak-tight means of sealing the elementary cell or device to completely prevent the entry of air and/or atmospheric humidity and release of humidity contained in the layer of electrolytic material. A protective insulation of the device is generally desirable or even necessary in the case of functioning in extreme atmospheric environments which are corrosive or aggressive, in order to limit or prevent the contaminants and possible corrosive agents present in the external medium from gaining access to the components of the device, including those external to the cells (such as, for example, the connecting conductors). But, generally, this may be accomplished without having to go up to the constraints of a leak-tight sealing of each cell.

With regard to devices such as very large-area display panels, it is known that these can be naturally subjected to a set of stresses capable of effecting their physical integrity and correct functioning. Because of this large size, differential thermal expansions (for example, those resulting from the unilateral or partial exposure to the sun or from the asymmetric proximity of a heat source), flexions (for example, those resulting from the effect of wind or mechanical stresses imposed by the supporting architecture or framing), and vibrations (for example, those induced by passing traffic or by shocks), for example, give rise to local strains and stresses which can be considerable. They are capable of altering the physical integrity of the modulating cells, degrading the quality of the electrical contact at interfaces, and altering the leak-tightness of the seals which are essential in known (especially electrochromic) display devices.

On the other hand, in the present devices, the combination of properties of plastic or viscoelastic deformability, of pressure-sensitive adhesion of the electrolytic material, and the absence of the necessity of strictly leak-tight sealing, enables large panels not to be affected in their integrity or functioning by the above-mentioned thermal and mechanical stresses.

Such a device thus generally described is now described in more detail.

The working electrode comprises a material having properties of electronic conduction and substantial optical transparency. It may be, for example, a thin layer, generally of a few tens to a few thousand Angstroms thickness, of gold, tin oxide ("TO"), indium oxide, mixed oxide of tin and indium ("ITO"), or equivalent. This list is not to be construed as limiting, and its entries are solely indicative.

Such a layer is generally deposited on a transparent substrate such as a glass plate or a sheet of plastic material which can then constitute a front substrate of the elementary device. It can even constitute a single front substrate for all the individual working electrodes of an independent device when it comprises a multiplicity of picture elements. In this case, the individual working electrodes comprise a pattern of portions of thin transparent conductive layer deposited on such a single front substrate or are patterned by selective etching of a single layer. The "NESA" glass produced by PPG INDUSTRIES, comprising a thin layer of tin oxide deposited on a glass plate, is an example of a transparent electrode and a substrate which can be used.

The counter-electrode is fabricated like the working electrode from a conductive and transparent material if the light-modulating device is intended to function by transmission or by transparency. If it is a thin layer deposited on a transparent substrate of glass or plastic material, the latter can constitute a single back substrate of all of the counter-electrodes of a modulating device when the latter comprises a multiplicity of picture elements. In this case, in the same way as the individual working electrodes, the individual counter-electrodes comprise a pattern of portions of thin transparent conductive layer deposited on such a single back substrate, or are patterned by selective etching of a single layer.

However, if the modulating device already comprises a single front-substrate capable of forming a mechanical support for the device, it can be advantageous (particularly in order not to introduce possible additional rigidity) to have counter-electrodes mechanically independent from each other (and consequently, not to constitute a single back substrate). The counter-electrode does not need to be transparent if the light-modulating device is intended to function by reflection. It is then sufficient for it to have electronic conduction properties. A very large number of homogeneous or composite materials having electronic conduction are suitable. It is advantageous to use counter-electrode materials in the form of sheets and layers of small thickness, and preferably having, in this form, a certain flexibility or deformability.

"Counter-electrode material" is understood to mean a homogeneous or composite material from which it is possible to fabricate a surface pattern of counter-electrodes. Such a material can be, for example, a flexible sheet of pyrolytic graphite, a plastic material filled with carbon particles or metal particles, a conductive paste for silk screening, or a sheet of plastic or glass material of which one face is covered with a thin layer of a transparent semiconductor oxide.

For example, it is possible to use as a counter-electrode material, thin metallic sheets, flexible sheets of pure graphite (the "Grafoil" flexible sheets by Union Carbide or the "Papyex" flexible sheets by Carbone Lorraine, and so forth), graphite or carbon sheets or fabrics ("RVC" carbon felts and "RVG" graphite felts carbon fabric "TCH" and graphite fabric "TGM" by Carbone Lorraine, and so forth). This list is not to be construed as limiting the invention, and its elements are solely indicative.

It is also possible to use composite conductor materials such as sheets of plastic or elastomer materials (polyvinyl chloride, polyolefins, silicones, and so forth) filled with particles, fibers or flakes of substances having electronic conductivity, for example, metals: copper, silver and nickel in particular (such as the "Conmax" by Tecknit filled with nickel in particular), semiconductors: tin oxide, indium oxide in particular, graphite or carbon (such as "Condulon" sheets by Pervel Industries, "Cabelec" by Cabot, "Abbey 100" by Abbey Plastics Corporation in particular). This list is also not to be construed as limiting the invention, and its elements are purely indicative.

It is also possible to use as a counter-electrode material an originally fluid conductive composition, generally composed of a resin and a particulate electronic conductive filler and possibly a solvent, deposited on a substrate and then dried or polymerized, for example, an ink or a conductive paste which can be silk-screened (such as the graphite-based "Electrodag 423 55" by Acheson, the copper-based "ACP-020J" and the graphite based "TU-40S" by Asahi Chemical, and so forth), or, for example, a conductive varnish or conductive paint (such as the copper-based "Copalex 100" by Showa Denko, the nickel based "Electrodag 440AS" and the graphite-based "Electrodag 5513" by Acheson, the silver-based "Acrylic-I" and the carbon-based "Latex 1000" by Tecknit, and so forth) deposited in a thin layer by known techniques of silkscreening, gun spraying, coating by air gap or coating bar, immersion, and so forth. (The so-called "thick film" techniques are understood to mean all of these techniques and various techniques for the formation of a film or solid layer in thicknesses of the order of those previously defined as being of "small thickness" from a fluid material.)

In this case it is possible to use one of the previously quoted conductive materials in the form of a sheet, and thus to fabricate counter-electrodes having composite structure provided by the association, for example, in superimposed layers, of several different counter-electrode materials, an association which is possibly capable of advantageously combining their characteristics. It is also possible in this case to use an electrically insulating substrate, impervious or alternatively porous or alternatively perforated, for example, a thin film of electrically insulating plastic material which is impervious or perforated or a sheet of a non-woven synthetic fiber material. This arrangement can advantageously be implemented in a display device comprising a multiplicity of picture elements. It enables on a single back insulating substrate (preferably in the form of a thin flexible sheet) to simply and economically produce the entire pattern of counter-electrodes using the thick film techniques mentioned above.

This single insulating back substrate can be permanent (that is, constitute a definitive component of the display device). It can also, by an appropriate choice as a sheet of non-adhesive plastic material and/or of a sheet covered with a layer of coating release material, be present only temporarily, to subsequently be removed once the device is completed. In this case, it only constitutes a convenient intermediate means of manufacture, enabling advantageous production of the pattern of counter-electrodes.

It is also possible, in another embodiment of a counter-electrode of a device, to deposit an originally fluid conductive composition using thick film techniques directly on the layer of electrolytic material, which is itself possibly already previously applied to the working electrode. In a display device comprising a multiplicity of picture elements, it is thus possible to directly apply (using thick film techniques and using appropriate screens, stencils and/or masks) a desired pattern of portions of the counter-electrodes layer on a coordinated pattern of portions of the electrolytic material layer which is itself already applied on another coordinated pattern of working electrodes deposited on a transparent substrate which can constitute a mechanical support for the whole of the display device. It can even be capable of constituting the sole mechanical support of the device.

The above portions of the layer or layers of reduced area forming a counter-electrode are portions of layers which are independent from each other and which can, depending on the case, each belong to an elementary cell or can each be common to a particular restricted group of elementary cells. For example, they may be common to the cells of a same row or a same column.

The layer of electrolytic material can be used in the light-modulating device by application or formation of a layer 3 in contact with one of the two electrodes according to one of the described processes, followed by the application of the other electrode in contact with the free face of the layer of material. As already mentioned, with the preferred method of producing the electrolytic material which provides it with a tack or a pressure-sensitive adhesion or superficial adhesion, it is not essential to provide specific mechanical means for maintaining the cohesion of the elementary cell thus fabricated. Nor is it essential to provide and conserve an excellent physical and electrical contact at the interface between each electrode and layer of electrolytic material, the adherence of the layer of electrolytic material to each electrode being sufficient for this purpose.

With this method of producing the electrolytic material, the latter can also be implemented by application or formation of a first layer in contact with one of the two electrodes, and a second layer in contact with the other electrode, followed by the joining the two layers into a single composite layer by placing in contact and adhesion with each other the free faces of the two layers.

In a display device comprising a multiplicity of picture elements, the layer of electrolytic material can be common to all elementary display cells, and can occupy the entire surface of the screen. It can also be distributed according to a surface pattern (that is, divided into portions of layer or layers of reduced area which are independent and distributed over the screen, each belonging to an elementary cell or each common only to a restricted number of elementary cells, for example, common to the cells of a same row or a same column in a matrix display device). Obtaining such surface patterns is particularly easy with the described electrolytic material due to the techniques of masks, stencils, screens, and so forth, used in the "thick film" depositing processes.

The means of electrical connection inside the independent device can be chosen from among all of the electrical linking or connection processes which can be used.

"Electrical connection material" means a material which is homogeneous or composite from which it is possible to fabricate one or more surface patterns of electrical connections connecting the elementary cells to the connector(s) or connection zone(s) to which the power supply and electronic control and addressing circuits must be connected. Such a material can, for example, be a silver or copper paste for silk screening, a conductive lacquer, a self-adhesive copper strip or a printed circuit conductor in particular, the list not intended to limit the invention, its elements being solely indicative.

It can be advantageous to use conductive inks, pastes or lacquers, particularly based on particulate silver (such as, for example, "Electrodag 1415" and "Electrodag 427 SS" by Acheson, "CON/RTV-I" by Tecknit, "LS-400" by Asahi Chemical, "L 2003" and "L 2030" by Demetron, and so forth) which, implemented by thick film techniques, conveniently enable the establishment of electrical contact of very good quality with both the working electrode and the counter-electrode. It also establishes an electrical bond or "weld" (that is, a means for electrical connection) between one or another electrode and an internal connecting conductor such as a metal wire, copper strip, printed circuit board conductor, or conductive ink or paste. The latter more specifically enable the construction of a connecting conductor which can be conformed to any relief and path whatsoever (such as those imposed by the back surface of a display device comprising a multiplicity of picture elements to which it is advantageous to apply). It furthermore enables it, by an appropriate choice of ink, to be deformable without rupture. Such connecting conductors enable each electrode to be connected in a very practical way to a metallic conductor or to a rigid assembly of metallic conductors (such as a printed circuit board distant from the electrodes to be connected), or to connect each electrode to a conductor or connection zone of the device (for example, at one edge, from which it can be more convenient to connect the device electrically to the addressing and control electronics).

Means for masking the periphery of the picture element, (that is, in the case of a display device comprising a multiplicity of picture elements, of the interstitial space filling the entire screen surface with the exception of the picture elements themselves) can be necessary for concealing the internal connecting conductors and all other elements of the structure of the display device which could be visible. It can also be necessary, as simultaneous means of contrast, for contributing to the contrast of the written picture elements with respect to the remaining part of the screen, this remaining part comprising the non-written picture elements and this interstitial space.

In the case, for example, of a display device operating solely by reflection, the picture element appears black when it is written and white (because of, for example, a contrasting white pigment present in the electrolytic material) when it is erased (that is, not written). It is then desirable, in a first method of display (which can be briefly summarized as the display of black images on a white background) that the means for masking the periphery of the image picture element should have a white appearance which is as close as possible to the white of the non-written picture elements, which contributes to emphasizing the black of the written picture elements in comparison with their environment comprising all the non-written picture elements and the peripheral interstitial space, thus maximizing contrast.

In a second method of display which can be briefly summarized as the display of white images on a black background, it is conversely desirable that the means for masking the periphery should have a black appearance as close as possible to the black of the written picture elements. This contributes to emphasizing the white of the non-written picture elements in comparison with their environment comprising all the written picture elements and by the peripheral interstitial space, here again maximizing contrast.

In the case of a display device functioning by transmission (that is, back lit), it is generally preferable to minimize reflection of ambient light by the periphery of the picture element which degrades the contrast, and consequently, to give to this periphery a black appearance or at least a dark appearance and as little reflecting as possible.

In the case of display devices functioning by reflection, the means of masking and contrast of the periphery of the picture element are already intrinsically created when the layer of electrolytic material is given to the whole extent of the screen surface: the masking and contrasting pigment present in the layer of electrolytic material applies its action over the entire screen surface.

If it is not desired or if it is not possible, for a device functioning by reflection, to give to the layer of electrolytic material an extent covering the entire screen surface (for example, resulting from the choice of a manufacturing method of the device) which does not permit it, or, if the device is intended to function by transmission (and therefore uses a transparent electrolytic material), it is appropriate to implement specific masking and contrasting means for the periphery of the picture element.

Such masking and contrasting means can comprise, for example, application to this periphery (prior to the positioning of the means of connection and all of the components to be masked) a layer of masking and contrasting material such as a layer of paint, ink, varnish, polymer or elastomer containing pigments and/or colorants in quantities such that a layer of sufficient thickness constitutes an opaque mask exhibiting the desired color. Very numerous materials in these categories can be suitable, particularly those capable of drying or hardening or cross-linking at ordinary or slightly raised temperatures. Suitable materials with these characteristics include, for example, paints, lacquers or cellulose, vinyl, acrylic varnishes, and in particular colored inks and pastes for silk screening, single-component pigmented silicone elastomers reticulating at ambient temperature (such as the "Rhodorsil CAF" by Rhone-Poulenc, in particular), pigmented two-component resin-hardener or resin-catalyst mixtures (epoxy, silicones in particular) polymerizing or vulcanizing at ambient temperature or at a temperature close to ambient temperature in particular. Such materials are commercially available in the form of suspensions and/or solutions in an appropriate solvent or in the form of a not cross-linked monomer fluid as a single component or as two components to be mixed shortly before use.

They can be applied in a regular coat on the back side of the device, through an appropriate pattern of masks, screens, stencils, and so forth, intended to protect the zones which must not be covered (for example, the points, lines or zones of the working electrodes and counter-electrodes where electrical contacts must be made in the case in which the electrical connections are established after masking) or which must not be masked (for example, the transparent counter-electrodes on the portion of their area corresponding to the picture element itself in the case of a device functioning by transmission). This may be achieved particularly with the help of all known appropriate application techniques: gun spraying, silk screening, immersion, coating by roller, and printing techniques in particular.

Means of insulation and protection of the components of the device from the external environment are generally desirable or even necessary to prevent contact between these contaminant components and/or corrosive agents present in the external atmospheric environment, and possibly to protect them from rain, fog, and various accidental projections, and possibly from shocks. In extreme cases it may be considered necessary to give these means of insulation and protection a strict degree of imperviousness to liquids, gases, or any other substances whose penetration into or exit from the device is not desired.

Such means of insulation or protection can, for example, comprise an additional layer of paint, varnish or resin, particularly such as described previously as masking and contrasting means applied using the above-mentioned techniques over the entire rear face of the device if such a layer has a sufficient imperviousness to liquids and gases. Such means can, more generally, comprise the coating, potting or impregnation of the device to be protected and, in particular, of the rear face by means of a polymer or an elastomer available in the form of a fluid monomer with an added hardener or reticulation catalyst, a suspension or solution of resin in a liquid or appropriate solvent, able (not necessarily) to contain a filler.

In particular it can be advantageous to cover, embed or impregnate the rear of the device starting from its edges with a potting or sealing resin of the type used for potting printed circuits, for example, resins which are adhering and preferably flexible after cross-linking, such as silicone elastomers (for example, "RTV" by General Electric, and so forth). Such a polymer is preferably colorless and transparent if the device is intended to function by transmission (for example, the "RTV 615" silicone rubber by General Electric). Such a resin which is transparent and has good optical properties may also serve for totally potting such a device, whether it functions by transmission or by reflection, providing it with maximum protection.

Even though specific means of cohesion of cells are not essential in the case in which this cohesion is provided by the pressure-sensitive adhesion properties of the electrolytic material, the means of masking and the above means of insulation and protection can contribute to cohesion.

A picture element is determined in shape, size and position by the intersection of orthogonal projections, on the screen surface, of the areas of the first electrode, the counter-electrode and the layer of electrolytic material of each elementary display cell.

The possibility of defining a picture element simply by such an intersection results from the above revelation that (in the described light-modulating process, and with components having the indicated thicknesses) the picture element is the area corresponding to such an intersection. The area is delimited by a remarkably sharp contour, even though it is formed at a distance from the counter-electrode equal to the thickness of the layer of electrolytic material. While it could have been expected to have a blurred or diffused contour, at least for the portion of the contour determined by the counter-electrode, the increase in optical density, once formed, neither diffuses nor is diluted at the periphery of the picture element.

Advantage is taken of this possibility for the economic construction of display devices according to a possible embodiment comprising a multiplicity of picture elements, in particular, very high-resolution dot matrix devices. (This embodiment is denoted below by "matrix panel".)

According to this embodiment, each of the elementary display cells is mainly described as the superposition of three layers or films (electrode, layer of electrolytic material, counter-electrode). Each of these three principal components is able to serve to define a portion or the totality of the contour of each picture element, without it being necessary to make use of other means and/or other components. Each component of such an elementary cell only functions or operates within the contour of the picture element. Any extension of this component beyond this contour can, if necessary, be used in another adjacent elementary cell without it being necessary to provide a substantial gap between the two zones of the component other than that corresponding to the relative geometry of these two adjacent image points.

It is not essential to limit the minimum dimension of the picture element to allow for a diffused or blurred contour and arrange for the existence of a sufficient zone of maximum optical density. Each picture element can be as small as the application or patterning techniques of the films or layers constituting the components allow.

It is not essential to provide a substantial minimum separation or gap between adjacent picture elements in order to avoid inter-penetration of these picture elements due to a diffused or blurred contour which would have the effect of reducing resolution and contrast.

Neither is it essential to provide a substantial minimum gap between adjacent picture elements to avoid an inter-penetration of these picture elements which would be due to diffusion or dilution of optical densification of a picture element within its periphery (that is, in the adjacent picture elements).

Finally, it is no longer essential to provide, in order to maintain the optical densification of a picture element at its contour, additional particular means of confinement of the picture element within a determined contour which would increase the area occupied by the individual cell and consequently would increase the gap between adjacent picture elements and, furthermore, would increase the complexity and cost of the display device.

On the screen area of a display device comprising a multiplicity of picture elements, a "surface pattern of picture elements" is understood to mean the surface geometric pattern of the individually addressable picture elements desired, such that the optical densification (that is, the darkening or opacification of selective combinations of these picture elements) can represent alphanumerical characters, images and other graphical arrangements which are to be displayed. A surface pattern of picture elements of a display device corresponds to a spatial distribution in the device of elementary display cells whose components are (in the described display devices) superimposed layers or films of defined shape and area. The shapes' orthogonal projection on the screen area includes at least the picture elements.

Each elementary cell can comprise its own individualized components. But it is possible that similar components of a given type are separate zones of a single component which is common to some or all of the elementary cells. For instance, in a dot matrix type display device, the transparent electrodes of a same column of pixels can be part of a single transparent conductive electrode in the shape of a strip, common to all of the elementary cells of the column.

On a display device screen comprising a multiplicity of picture elements, "surface pattern of components of the same type" is understood to mean the geometric pattern formed by all of the components of the elementary display cells belonging to this same type of component, each of such components being able to belong to one cell or to be common to a group of cells.

"Intersection of several superimposed surface pattern" is understood to mean the geometric pattern formed by common areas of the orthogonal projections on the screen area of the various surface patterns concerned.

For linguistic convenience, it is appropriate that the expression "common to a group of cells or elementary devices" and applied to the term working electrode or counter-electrode or layer of material (or portions of each of them) applies when the working electrodes, counter-electrodes and the layers of material respectively of the group of cells or devices concerned are mutually distinct zones of the component referred to as common to this group.

"Coordinated (or conjugated) surface patterns" of components of a display device is understood to mean superimposed surface patterns of components of each type, such that the association of the components determines as many complete elementary display cells as the number of picture elements the display device must comprise, and such that the spatial distribution and size of these elementary cells are compatible with the desired locations and dimensions of the picture elements on the screen of the device.

In order to construct, according to this embodiment, a display device comprising a multiplicity of picture elements, there is associated by superimposing (without using other means for assisting in the delimitation or separation of the picture elements) three surface patterns of components patterned and coordinated in such a way that their intersection defines the desired surface pattern of individually addressable picture elements. The surface patterns comprise one surface pattern of transparent working electrodes, one surface pattern of portions of layer of electrolytic material, and one surface pattern of counter-electrodes, in this order.

By convention, the term "pattern" has been reserved in the rest of the description to all possible cases, with the exception of those in which the component concerned is single and common to all of the elementary cells of the device, in which case the qualifying expression "single and common to the entire screen" applied to the component concerned, is used.

According to this embodiment of a display device comprising a multiplicity of picture elements, there are numerous possibilities of structure and construction. Each component of different type can be used for defining a portion or the entire contour of picture element as described above. It is possible to choose, for a given display device, the most advantageous combination of patterns from the point of view of simplicity of manufacture of the elementary cells and internal electrical connections of the device. According to the types of components chosen for distribution over the screen according to a surface pattern and those chosen to retain as a single component common to all of the elementary cells of the screen, there are, in particular, the following combinations:

First variant: Working electrodes 2 alone are distributed according to a surface pattern, counter-electrode 4 and layer of electrolytic material 3 being single and common to the entire screen. This is an arrangement which can be used in particular for direct addressed devices (FIG. 8A).

Second variant: Counter-electrodes 4 alone are distributed according to a surface pattern, working electrode 2 and layer of electrolytic material 3 being single and common to the entire screen. This is an arrangement which can be used in particular for direct addressed devices (FIG. 8B).

Third variant: Working electrodes 2 and portions of electrolytic material 3 distributed according to coordinated surface patterns, counter-electrode 4 being single and common to the entire screen. This is an arrangement which can be used in particular for direct addressed devices (FIG. 8C).

Fourth variant: Counter-electrodes 4 and portions of layer of electrolytic material 3 ar distributed according to coordinated surface patterns, working electrode 2 being single and common to the entire screen. This is an arrangement which can be used in particular for direct addressed devices (FIG. 8D).

Fifth variant: Working electrodes 2 and counter-electrodes 4 are distributed according to coordinated surface patterns, layer of electrolytic material 3 being single and common to the entire screen. This is an arrangement which can be used in particular for direct addressed devices or for matrix addressed devices (FIG. 8E).

Sixth variant: Working electrode 2, counter-electrodes 4 and portions of layer of electrolytic material 3 are distributed according to three coordinated surface patterns. This is an arrangement which can be used in particular for direct addressed devices or for matrix addressed devices (FIG. 8F).

Furthermore, in the last four variants, surface patterns of two types of components can advantageously be identical or substantially identical, (that is, they may be merged or substantially merged, in numerous cases where this merging is likely to constitute an advantage, for example, from the point of view of manufacture).

The following possibilities can thus be considered:

Sub-variant of the third variant: Merged patterns of working electrodes 2 and portions of layer of electrolytic material 3, counter-electrode 4 single and common to the entire screen.

Sub-variant of the fourth variant: Merged patterns of counter-electrodes 4 and portions of layer of electrolytic material 3, working electrode 2 single and common to the entire screen.

Sub-variant of the fifth variant: Merged patterns of working electrodes 2 and counter-electrodes 4, layer of electrolytic material 3 common to the entire screen.

First sub-variant of the sixth variant: Merged patterns of counter-electrodes and portions of a layer of electrolytic material 3, different coordinated (conjugated) patterns of working electrodes (FIG. 8G).

Second sub-variant of the sixth variant: Merged patterns of working electrodes 2 and of layers of electrolytic material 3, different coordinated patterns of counter-electrodes 4 (FIG. 8H).

Third sub-variant of the sixth variant: Merged patterns of working electrodes 2 and of counter-electrodes 4, different coordinated pattern of portions of layer of electrolytic material 3 (FIG. 8I).

Fourth sub-variant of the sixth variant: Merged patterns of the three types of components (FIG. 8F).

All of these variants of particular combinations of structures can be produced by the first method of manufacture described below. The sub-variants of the fourth variant and the first and fourth sub-variants of the sixth variant can also be produced by the second manufacturing process, also described.

"Associated pattern of a material, component or constituent" is understood to mean an appropriate geometric and suitably associated pattern, connected or combined with components of elementary cells of a light-modulating device comprising a plurality of cells, of a material, component or peripheral constituent, extrinsic or specific, necessary for the functioning of the elementary cells and/or enabling the use of the device as an independent unit.

A first possible method for manufacturing a light-modulating device comprising a multiplicity of picture elements, particularly applicable to the preferred structure, which lends itself to industrial manufacture at low cost price, comprises applying (using known "thick film" techniques such as the silk screening techniques) a layer of electrolytic material and a layer of counter-electrode material, each divided into portions of layer defined and distributed according to surface patterns coordinated with a surface pattern of transparent electrodes, in order, in particular, that the intersection of the areas defined by the three patterns determines the desired surface pattern of picture elements.

It also comprises possibly applying (using the same thick film techniques) associated patterns of connection and/or insulating materials capable of being implemented using the above-mentioned techniques, and forming the network of internal electrical connections of the device or at least part of the latter.

It also comprises possibly applying (using the same thick film techniques) associated patterns of masking and contrasting material, insulation, protection, impregnation or potting material, as well as any other material used in the construction of a light-modulating device and capable of being used by these techniques.

Use of layers of electrolytic material implemented by thick film techniques (such as, in particular, the silk screen techniques), combined with use of inks, pastes, lacquers, varnishes and resins (in particular conductive, insulating and pigmented), in particular implemented by the same techniques in order to produce the counter-electrodes, current leads, electrical connections, contrasting masks, coatings, pottings or protective impregnations or insulation, enables implementation of the first method of manufacture of display devices comprising a multiplicity of picture elements.

According to this process, there are formed (on suitable supports or substrates, using thick film techniques and using screens, stencils and/or appropriate masks) coordinated surface patterns and associated surface patterns of the various above-mentioned components, materials and constituents. And, by these means, there is manufactured at least part of the independent device comprising at least the totality of the elementary light-modulating cells and possibly at least part of the peripheral and extrinsic components of the cells and of the specific components and constituents of the independent device.

According to a first variant of this first method of manufacture, there is produced at least part of the display device by applying in superposition (using thick film techniques on a transparent substrate forming a mechanical support and comprising a surface pattern of transparent working electrodes) at least the following:

a coordinated pattern of portions of a layer of electrolytic material;

a pattern coordinated with the previous ones, of portions of layer of counter-electrode material, these three patterns being in particular such that their intersections determines the desired pattern of picture elements;

and, possibly:

an associated pattern of peripheral contrasting or masking material;

associated patterns of current leads, of connecting conductors and of insulating layers comprising at least part of the network of internal connections of the device connecting the working electrodes and the counter-electrodes of the elementary cells to a connection zone or zones or to a connector or connectors, these patterns being combined in such a way that the various conductors are insulated from each other and from the working electrodes and the counter-electrodes to which they do not have to be connected;

associated patterns of layers or applications of protective, insulation, impregnation or potting materials.

The order of applications being able to be different from the order described above.

According to a second variant of this first method of manufacture of a light-modulating device of small thickness, there is produced at least part of the display device by applying in superposition (on a first substrate, using thick film techniques such as, in particular, the silk screening techniques):

at least one layer of counter-electrode material and one layer of electrolytic material, each divided into portions or defined zones and distributed according to coordinated surface patterns, and possibly associated patterns of current leads, of connecting conductors and of insulating layers constituting at least part of the network of internal connections of the device, associated patterns of masking and contrasting material, of insulation, impregnation, protection or potting materials, as well as any other material likely to be used in the construction of the light-modulating device and capable of being implemented by the above-mentioned techniques, and by applying in a single movement or progressively by zones depending on the case this first substrate at least already coated with some of its layers to a second transparent and preferably rigid or substantially rigid substrate provided with a surface pattern of transparent electrodes coordinated with the two previous coordinated patterns, these three patterns being in particular such that their intersection determines the desired pattern of picture elements. The application is made in such a way as to enable the maintaining by pressure, or by pressure-sensitive adhesion of at least the assembly of layers of the first substrate in contact with the second substrate.

According to this second variant there is produced at least part of the display device by applying to a first substrate (using thick film techniques) at least the following:

a pattern of portions of layer of electrolytic material;

a pattern coordinated with the previous one of portions of layer of counter-electrode material;

and, possibly:

an associated pattern of peripheral masking or contrasting material;

associated patterns of current leads, connecting conductors and insulating layers constituting at least part of the network of internal connections of the device connecting the working electrodes and the counter-electrodes of the elementary cells to a connection zone or zones or a connector or connectors, these patterns being combined in such a way that the various conductors are insulated from each other as well as from the working electrodes and counter-electrodes to which they do not have to be connected;

associated patterns of layers or applications of protection, insulation, impregnation or potting materials, the order of applications being able to be different from the order described above, and by applying the first substrate coated by at least some of the various above-described patterns to a second transparent substrate forming a mechanical support and comprising a surface patterns of transparent working electrodes coordinated with those of the layers of electrolytic material and of counter-electrodes, these three patterns being, in particular, such that their intersection determines the desired pattern of picture elements, the application of the first substrate to the second being carried out in such a way as to enable to maintain by pressure or by pressure-sensitive adhesion, the whole formed by the patterns applied to the first substrate in contact with the second substrate.

It is possible, in a first sub-variant of this second variant of the first method (in which the first substrate is preferably chosen from a material having anti-adhering properties or coated with a coating release material) to perform the transfer onto the second substrate of the patterns coated or applied to the first substrate and to follow this by removing the latter. Such a first substrate can appropriately be, for example, a thin flexible sheet having an anti-adherent surface which can, once coated (that is, coated with its patterns), be completely applied to the second substrate in a single movement or by unrolling it and then removed, progressively separating the assembly formed by the superimposed configurations starting from an edge or a corner. This assembly is maintained in contact with the second substrate, preferably by means of the pressure-sensitive adhesion properties of its concerned face, in particular resulting from the pressure-sensitive adhesion of the electrolytic material in a preferred composition. It can also, for example, be a rigid cylinder which transfers all of its coated or applied patterns to the second, generally flat substrate when it is made to roll on the latter.

It is also possible, in a second sub-variant (in which the first substrate is preferably a thin flexible insulating or insulated sheet without anti-adherent surface state) to allow (once this first substrate coated and applied to the second substrate) this first substrate to remain in position and then become a permanent component of the device. Such a first appropriate substrate can be, for example, a thin flexible impervious sheet of plastic material.

It is also possible, in a third sub-variant of the second variant of the first method of manufacture (in which the first substrate is preferably a thin flexible sheet without anti-adherent surface state which has a certain porosity distributed or localized according to a distribution) to apply part of the coatings on the front side (that is, on the face which must be applied to the second substrate) and another part on the reverse side of this first substrate, the electrical connections necessary between the layers located on either side of the first substrate being made through the porosity. Such an appropriate first substrate can be, for example, a sheet or non-woven material of synthetic fibers, a sheet of impermeable plastic material in which perforations have been made according to a particular distribution. The layers which must be applied to the rear side of the first substrate, or at least some of them, can be applied before or after application of this first substrate already coated with front surface layers to the second substrate.

In another method of implementation of the present sub-variant, the layers which must be applied on the reverse side of the first substrate (or at least some of them) can be so applied after application of this first substrate, already coated with rear side layers to the second substrate. This latter method is particularly advantageous when the device comprises a multiplicity of electrical current leads to the working electrodes, distributed over the surface of the second substrate. It is easily possible (by application, for example, of a single layer suitably distributed in appropriate portions forming an associated pattern of electrical connection material such as a conductive ink or paste or equivalent on the reverse side of the first substrate) to simultaneously fabricate the current leads in contact with the working electrodes through the porosity of this first substrate, and to electrically connect them to the network of internal electrical connections of the light-modulating device.

According to a third variant of the first method of manufacture, the two first variants are combined with each other. That is, there is applied part of the constitutive layers or coatings of the various patterns concerned according to the first variant, and another part according to the second variant. The first substrate of the first variant then has to be considered as merged with the second substrate of the second variant.

The first method thus described implements the thick film techniques which are known to the man skilled in the art of these techniques. For this reason, these techniques are not described again here, the invention essentially consisting in applying these thick film techniques to the modulating cells and devices.

A second possible method of manufacture of a light-modulating device comprising a multiplicity of picture elements, in particular applicable to the preferred structure, which lends itself to industrial manufacture at low cost price. The second method comprises applying (to a single transparent substrate comprising a surface pattern of transparent electrodes of a coordinated surface pattern of dots, segments or strips comprising, associated in a single composite film) at least one layer of the present electrolytic material and one counter-electrode (for example, pellicular).

This second method of manufacture of a light-modulating device (in particular of a display device) comprises manufacturing (according to known techniques, in particular, of extrusion, rolling, calendaring, coating, or equivalent) a film, sheet or composite strip formed of at least one layer of electrolytic material applied to a counter-electrode in the form of a film, sheet, strip or equivalent and preferably flexible, and possibly a layer of electrical connection material applied to the outside face of the counter-electrode film. It also comprises cutting out from this film or composite sheet (using known techniques of punching, stamping and laser cutting in particular) of elements in the form of dots, segments or strips.

In this second manufacturing process, at least part of the light-modulating device is produced:

by fabricating a single composite sheet or film formed from at least one layer of the present electrolytic material and one counter-electrode in film or sheet form, preferably flexible, to which the layer of electrolytic material is applied, and possibly a layer of electrical connection material applied to the outer face of the counter-electrode;

by cutting in this film or composite sheet elements in the form of dots, segments or strips;

in distributing these elements according to a pattern on a transparent substrate provided with a coordinated surface pattern of transparent electrodes, these patterns being in particular such that their intersection determines the desired pattern of picture elements;

by fixing these elements on the substrate by contact or by pressure-sensitive adhesion;

and possibly by applying:

an associated pattern of contrasting or peripheral masking material;

associated patterns of current leads, connection conductors and insulation layers constituting at least part of the network of internal connections of the device connecting the working electrodes and the counter-electrodes of the elementary cells to a connection zone or zones or to a connector or connectors. These patterns are combined in such a way that the conductors are insulated from each other and from the transparent electrodes and counter-electrodes to which they do not have to be connected;

associated patterns of layers or coating of protection, insulation, impregnation or potting materials;

the order of these coatings being able to be different from the order described above.

According to this second process, the counter-electrode in the form of a sheet or film or thin equivalent can be any of the previously described counter-electrodes made from homogeneous material, composite material, of simple or complex structure, preferably flexible and deformable without damage, of thickness preferably between about ten microns and a few millimeters, more preferably between about ten and a few hundred microns. The layer of electrical connection material possibly applied to the outer face, can, if necessary, constitute an electrical current lead for the counter-electrode. The layer of electrolytic material preferably has the pressure-sensitive adhesion obtained in a preferred composition, and thus enables cohesion of the elementary cells of the device to be obtained by simple application to the substrate of the dots, segments or strips cut from the composite film or sheet.

The second method thus described therefore implements the mentioned techniques of extrusion, rolling, calendaring, coating or equivalent, laser cutting, punching, stamping, techniques which are known to the man skilled in the art of these techniques. For this reason, these techniques are not described again here, the invention essentially consisting in applying these techniques to modulating devices and cells.

Finally, the second method enables production of composite films thus described which are in the form of a film, sheet or strip comprising at least one layer of electrolytic material applied to an electronically conductive film, sheet or strip, and, if necessary, a layer of electrical connection material applied to the outer face of the electronically conductive film, sheet or strip.

EXAMPLES

Example 1

A fluid formative composition is prepared as follows:

| | |
|---|---|
| Zinc bromide | 6.0 parts by weight |
| Copper chloride | 0.1 |
| Calcium chloride | 1.6 |
| Hydrochloric acid | 0.2 |
| Triton X 100 | 0.2 |
| Hydroxyethylcellulose "Natrosol 250 HHRR" by "Hercules" | 1.6 |
| Water | 90.5 |

This corresponds to the electrolytic material whose composition in equilibrium with a relative atmospheric humidity of 50 percent is:

| Zinc bromide | 43.2 parts by weight |
|---|---|
| Copper chloride | 0.7 |
| Calcium chloride | 11.5 |
| Hydrochloric acid | <0.1 |
| Triton X 100 | 1.4 |
| Hydroxyethylcellulose | 11.5 |
| Water | 31.6 |

(where the ratio between the weight of water-soluble salts and that of the water is 1.75 and whose pH is approximately 1.7).

The above fluid formative composition is prepared by dissolving the first five constituents in half of the total water. To this is added, while stirring, the hydroxyethylcellulose previously dissolved in the rest of the water. This fluid formative composition, whose pH is 1.6, has an appropriate viscosity for being coated with a coating bar. On a second transparent electrode 2 of tin dioxide adhering to a glass plate 13 ("NESA" glass by PPG INDUSTRIES) several layers are successively applied, with intermediate dryings in hot air until solid consistency is obtained, until a layer of electrolytic material is obtained having a total thickness of twenty microns. The extent of this layer, which is transparent and practically colorless, is limited to a disk 3 of approximately 1 $cm^2$. On the free face of this layer of electrolytic material which exhibits a tack, there is applied a second transparent electrode 4 of tin dioxide, itself also adhering to a glass plate 14 (a second plate of "NESA" glass), having dimensions larger than those of the disk of electrolytic material (FIG. 10).

The transmission light-modulation cell 1 thus obtained (whose cohesion is provided by the adhesive properties of the electrolytic material layer alone) has (in the zone defined by the disk 3 of electrolytic material) an optical transmission which is higher than in the peripheral zone which comprises only the two "NESA" glass plates 13, 14. This higher transmission is very certainly due to smaller losses by reflection at the interfaces of the electrode and electrolytic material, than at the interface between the electrode and the air.

There is applied between the transparent electrodes a potential difference of 2.5 volts. By transmission, there is observed a progressive and uniform increase in the optical density of the cell over an area exactly delimited by the disk 3 of electrolytic material. By reversing the polarity of the potential difference, a lightening of the densified zone is observed until the restoration of the initial transmission or transparency. When this stage is reached, it is necessary to remove the erase voltage which would become a write voltage and start a new densification of the cell.

It is also possible to erase, but more slowly, simply by short-circuiting the cell 1.

It is also possible to combine a partial erasure by a time-limited application of a reverse voltage with the erasure of the residual optical density by short-circuiting. The variable light-transmission cell 1 thus obtained functions as a grey filter of which the optical density can be varied continuously from the initial transmission or transparency by controlling the duration for which the current is made to flow.

It is observed that there is a voltage threshold of about 1.8 volts, below which the cell 1 is not densified. Such a threshold enables the cell 1 to be lightened with an erase voltage lower than this threshold which can be maintained beyond complete erasure without fear of restarting an increase in the optical density despite this maintaining.

In a variant embodiment and constitution of the cell 1, there is applied a layer of electrolytic material on one of the transparent electrodes 2 supported by its glass substrate 13, and a second layer of electrolytic material on the second transparent electrode 4 supported by its glass substrate 14. The cell is formed by joining the two half-cells by application of the two free faces of the electrolytic material to each other. The adherence of the two layers to each other suffices to provide the structural cohesion of the cell 1.

The same tests with the transparent electrodes 2, 4 comprising a layer of mixed tin and indium oxide adhering to a glass plate ("ITO coated glass" by Donnelly) instead of the previous transparent electrodes is repeated. The appearance and behavior are substantially similar.

Example 2

The following fluid formative composition is prepared:

| Zinc (II) bromide | 6.0 parts by weight |
|---|---|
| Copper (III) chloride | 0.1 |
| Calcium chloride | 1.6 |
| Aluminum chloride | 0.2 |
| Hydrochloric acid | 0.2 |
| Triton X 100 | 0.2 |
| "7 HOF" Sodium carboxymethylcellulose by "Hercules" | 1.6 |
| Water | 90.1 |

This corresponds to the electrolytic material whose composition, in equilibrium with a relative atmospheric humidity of 50, is:

| Zinc (II) bromide | 42.9 parts by weight |
|---|---|
| Copper (II) chloride | 0.7 |
| Calcium chloride | 11.4 |
| Aluminum chloride | 1.4 |
| Hydrochloric acid | <0.1 |
| Triton X 100 | 1.4 |
| Sodium carboxymethylcellulose | 11.4 |
| Water | 30.7 |

During drying of the fluid formative composition, the sodium carboxymethylcellulose is progressively cross-linked by the trivalent cation Al(III) and therefore becomes cross-linked in the constituted layer of electrolytic material. This layer adheres to the surface on which it is formed, but its free surface does not exhibit pressure-sensitive adhesion.

On two glass plates, each covered with a transparent electrode, there is applied, as in Example 1, a layer of the above electrolytic material. Each layer adheres to the corresponding transparent electrode, but does not exhibit a tack on its free face. There is then applied on the free face of one of these two layers a very thin layer of the fluid formative composition of Example 1, which is then dried. Then, the two halves of the cell are joined and the cohesion of the cell is then maintained by means of the pressure-sensitive adhesion of the last applied layer.

The properties of the transmission cell thus formed are substantially the same as those of Example 1, but its mechanical solidity is greater.

Example 3

The fluid formative compositions and the electrolytic materials are modified, starting from those described in Examples 1 and 2, in the following way:

a) The following mixtures, expressed in relative weights of their constituents, are substituted for the mixtures of salts used in Examples 1 and 2:

|  | Relative weights |
|---|---|
| Variant 3.1.1 | |
| Zinc chloride | 120 |
| Nickel chloride (II) | 30 |
| Copper (II) chloride | 1 |
| Variant 3.1.2 | |
| Cadmium nitrate | 2 |
| Calcium chloride | 1 |
| Variant 3.1.3 | |
| Zinc perchlorate | 60 |
| Copper (II) perchlorate | 1 |
| Nickel (II) chloride | 30 |
| Variant 3.1.4 | |
| Zinc bromide | 60 |
| Iron (III) chloride | 1 | b) The following resins are substituted for the water-soluble film-forming polymer resins used in Examples 1 and 2:

Variant 3.2.1
Polyvinyl alcohol ("Poval 224" by Kuraray)
Variant 3.2.2
Polyvinylpyrrolidone ("K 90" by GAF Corporation)

c) The ratio (weight of mixture of water-soluble salts) / (weight of polymer resin) used is modified by about 5 in Examples 1 and 2 to bring it to the values 50 and 0.5.

The substitutions and modifications thus mentioned can be combined with each other. That is, the described variants can be combined.

With each of the combinations produced, variable light-transmission cells are produced in the same way as in Examples 1 and 2.

Example 4

The following fluid formative composition is prepared:

| Zinc bromide | 6.0 parts by weight |
|---|---|
| Copper (II) chloride | 0.1 |
| Calcium chloride | 1.6 |
| Hydrochloric acid | 0.2 |
| Triton X 100 | 0.2 |
| Hydroxyethylcellulose | 1.0 |
| "Natrosol 250 HHXB" by "Hercules" | 16.0 |
| Titanium dioxide "RL75" by "Titafrance" | |
| Water | 74.9 | corresponding to the electrolytic material whose composition in equilibrium with a relative atmospheric humidity of 50 percent is:

| Zinc bromide | 20.0 parts by weight |
|---|---|
| Copper (II) chloride | 0.3 |
| Calcium chloride | 5.3 |
| Hydrochloric acid | <0.1 |
| Triton X 100 | 0.7 |
| Hydroxyethylcellulose | 3.3 |
| Titanium dioxide | 53.3 |
| Water | 17.0 |

Using a coating bar, successive layers are applied, followed by dryings, of the fluid formative composition to the transparent electrode 2 of a plate of "NESA" glass until a layer of electrolytic material 3 is obtained, corresponding to a total thickness of about 100 microns covering the totality of the transparent electrode, with the exception of a peripheral band 16. This layer is white and opaque.

A disk of diameter 6 mm is cut in the following counter-electrodes 4, all in the form of flexible thin sheets:
Variant 4.1
Counter-electrodes in homogeneous material:
Sub-variant 4.1.1
Flexible pure graphite-sheet "Grafoil" by Union Carbide
Sub-variant 4.1.2
Pure graphite flexible sheet
"Papyex" by Carbone-Lorraine
Variant 4.2
Counter-electrodes of composite material:
Sub-variant 4.2.1
Sheet of plastic material filled with particulate carbon "Condulon" by Pervel Industries
Variant 4.3
Composite counter-electrodes with conducting substrate:
Sub-variant 4.3.1
Graphite sheet "Papyex" covered with a layer of graphite-based silk screening ink "Electrodag 423 SS" by Acheson.
Sub-variant 4.3.2
Graphite sheet "Papyex" covered with a layer of graphite-based silk screening paste "TU20S" by Asahi Chemical.
Sub-variant 4.3.3
Graphite sheet "Papyex" covered with a layer of copper-based silk screening paste "ACP-020J" by Asahi Chemical.
Sub-variant 4.3.4
Graphite sheet "Papyex" covered with a layer of conductive nickel-based varnish "Condulon 245" by Pervel Industries.
Variant 4.4
Composite counter-electrodes with insulating substrate:
Sub-variants 4.4.1, 4.4.2, 4.4.3 and 4.4.4 respectively identical to sub-variants 4.3.1, 4.3.2, 4.3.3 and 4.3.4, except that the flexible graphite sheet "Papyex" is replaced by a non-woven sheet of 30 micron thick polypropylene "Paratherm".

On the rear side of each of the counter-electrode disks, opposite the electrolytic material, there is deposited a layer 17 of silver lacquer "200" by Demetron. These disks 4, 17 are then applied (with a space between them) to the layer of electrolytic material 3. Finally, the rear side of each disk 4, 17 is connected to an edge 18 of the glass plate 15 by means of a pressure-sensitive adhesive copper strip Bishop "EZ" 19 resting on a pressure-sensitive adhesive polyester strip which insulates it from the layer of electrolytic material 3 and from the transparent electrode 2. This copper strip 19, which can easily be connected from the edge 18 of the plate to an external voltage source, is electrically integrated with the counter-electrode 4 by means of a drop 21 of silver lacquer "200". Finally, there is applied to the periphery of the transparent electrode a peripheral string of silver lacquer 2 which enables the transparent electrode 2 to be connected to the external voltage source. Neither the counter-electrodes nor the connections are visible or perceptible through the white opaque layer of electrolytic material (FIGS. 11 and 12).

The disks 4, 17 thus applied have a certain adherence to the layer of electrolytic material 3. However, this adherence is variable from one disk to another, and irregular from one point to another of a same disk (which, in operation, results in heterogeneities of optical density). A pressure is therefore applied to each disk in order to obtain and maintain a satisfactory electrical contact.

A potential difference of 1.5 volts is then applied between each disk-shaped counter-electrode 4, 17 and the transparent electrode 2, the latter being negatively polarized with respect to the counter-electrode 4. There is observed by reflection a darkening of each cell 1 according to an area exactly delimited by the projection of the disk 4, 17 constituting the counter-electrode. The optical density is uniform inside of each area, and it is possible to vary it according to a continuous grey scale by modulating the duration for which the electrical current is made to flow.

By applying a potential difference in the opposite direction, also of 1.5 volts, the created optical density is erased and the initial white appearance is restored. It is observed that it is possible to prolong the application of the erase voltage beyond the total erasure without visible disadvantage. The density obtained for a same duration of application of the write voltage varies according to the counter-electrode, which indicates possible differences in impedance.

It is noted that all of the cells, with the exception of those formed with the counter-electrodes of sub-variants 4.3.3, 4.3.4, 4.4.3 and 4.4.4, have a write threshold of about 1.25 volts. That is, no darkening is observed with a lower voltage. On the other hand, the cells formed with the above-mentioned four counter-electrodes have no threshold.

Example 5

The tests of Example 4 are repeated, but with application on the front side (that is, the face intended to be in contact with the electrolytic material) of each counter-electrode, before cutting the disks, a layer of about ten microns of electrolytic material of Example 1, according to the procedure of this Example 1.

The disks thus coated are then applied to the layer of electrolytic material of the Example 4 covering the transparent electrode on its glass substrate. This time, the disks remain stuck. The cohesion of the cells is maintained without it being necessary to apply pressure. Similarly, without external applied pressure, the functioning of each cell is uniform.

Example 6

The tests of Example 5 are repeated with the following differences:

1) no layer of electrolytic material is applied to the transparent electrode 2 fixed on its glass substrate 15;

2) on the front side of each counter-electrode 4 there is applied a layer of electrolytic material 3 of Example 4 in a thickness of about 100 microns (according to the application procedure described in Example 4);

3) from the composite sheets (counter-electrode-electrolytic material) thus produced composite disks 23 are cut out which are each applied to the transparent electrode 2. In this case, unlike that which was observed in Example 4, and probably due to the smoothness of the surface of the transparent electrode 2 unlike the generally irregular surface of the sheets of counter-electrode material, the adherence is uniform and satisfactory, despite the weaker pressure-sensitive adhesion of this material than that of the electrolytic material of Example 1. The individual cells do not require the application of a pressure in order to maintain their structural cohesion nor ensure good electrical contacts (FIG. 13).

The functioning of each cell is comparable to that of the cells of Example 5. The optical density is uniform inside the composite disk.

Example 7

There is applied a layer of electrolytic material 3 of Example 4 to a transparent electrode 2 supported by a glass substrate 24. On this layer 3 there is deposited by silk screening, portions of a layer in the form of square dots 25 sides 3.5 mm in length, of "Electrodag 423 SS" graphite based ink. On these square dots 25, after heat treatment, there is also deposited by silk screening portions of a layer in the form of square dots 26 sides 2.5 mm in length, of silver-based ink "429 SS" by Acheson for silk screen applications. Finally, again by silk screening, there is applied a layer of Acheson "432 SS" silk screening insulating varnish 27 covering the entire surface of the plate, except for the silver ink square dots and a strip 28 at the periphery of &:he transparent electrode 2.

There is deposited by gun spraying through a mask strings 29 of silver lacquer "200", connecting and joining each silver ink square dots 26 to an edge 29 of the glass plate 24 from which it is easier to make an electrical connection with an external power supply. At the same time there is deposited a peripheral band of silver lacquer, also enabling the transparent electrode to be connected to the external supply (FIGS. 14 and 15).

The appearance and characteristics of each cell are similar to those in Examples 4 and 5. In particular, the densification is uniform inside an area which is exactly delimited by the orthogonal projection of the square dot 25 of graphite ink.

Example 8

The procedure is as in Example 7, except that there is deposited on the transparent electrode (instead of a continuous layer of the electrolytic material concerned) portions of a layer of this material in the form of square dots with 3.7 mm sides, by silk screening, the fluid formative composition of Example 4 having been brought, by evaporation of water, to an appropriate viscosity for this application. Furthermore, instead of the transparent insulating varnish of Example 7, there is applied according to the same geometry, making use of the same openings, a layer of a few hundred microns thick of white silicone elastomer "Rhodorsil CAF 730" by Rhone-Poulenc, which vulcanizes in air in a few hours.

The appearance obtained is the same as that of the cells of Example 7, with a slight difference of color between the white of the square dots of electrolytic material and that of the white silicone elastomer, a difference which does not exist in the devices of Example 7. The darkening takes place in an area which is the orthogonal projection of the square dots of graphite ink (and not the area of the portions of electrolytic material).

Example 9

On a flexible sheet of 50 micron thick polyester, there is successively applied with dryings and/or intermediate heat treatments:

1) portions of a layer of silver ink for silk screening in the form of square dots with 2.5 mm sides, extended by a continuous strip to one edge of the sheet;

2) a layer of insulating varnish with openings of 2.5 mm side length, corresponding to the previous square dots;

3) portions of a layer of graphite ink for silk screening in the form of square dots of 3.5 mm width, centered on the silver ink square dots;

4) a layer of electrolytic material of the Example 4.

The flexible composite sheet thus obtained is deposited by unrolling it on a glass plate comprising a transparent electrode ("MESA" glass) provided with a peripheral strip providing contact with the transparent electrode. The composite sheet overlaps the glass plate in order to enable access to the ends of the silver ink strings.

The composite sheet adheres to the "NESA" glass due to pressure-sensitive adhesion of the electrolytic material, and structural cohesion of the display panel thus produced is provided without other means.

Each cell is individually addressable by applying a voltage between the transparent electrode and each silver ink string connecting each counter-electrode. The darkening of each dot appears exactly delimited by the orthogonal projection of the area of the square of graphite ink.

According to a variant embodiment of the present device, the plastic sheet serving as a primary substrate is a sheet coated with an anti-adhesive layer having a very weak adherence to the layers deposited on it. After producing the panel, this sheet is withdrawn and has therefore served only as a convenient intermediary in the production of the display panel.

Example 10

On a flexible polyester sheet of 50 micron thickness, there is successively applied with intermediate dryings and/or heat treatments:

1) portions of a layer of silver ink for silk screening in the form of parallel strips of width 0.3 mm;

2) strips of insulating varnish for silk screening, filling gaps between the above strips of silver ink;

3) portions of a layer of graphite ink in the form of parallel strips of width 0.4 mm, centered on the silver ink strips;

4) portions of a layer of electrolytic material of Example 4 in the shape of strips of width 0.45 mm, centered on the above strips.

The composite sheet thus obtained is applied, by unrolling it, onto a glass plate covered with a transparent conductive layer of tin dioxide patterned as independent 3.5 mm parallel strips separated by a gap of 0.1 mm diameter. The orientation of the composite sheet with respect to the plate is such that the strips or transparent electrode are perpendicular to the strips of the composite sheet. The composite sheet overlaps the glass plate such that the ends of its strips are accessible for connection to the addressing and control electronics.

The composite sheet adheres to the glass plate coated with its transparent electrodes because of pressure-sensitive adhesion of the electrolytic material. Structural cohesion of the display panel thus produced is provided without other means.

The columns comprising strips of conductive electrodes are connected by their ends to addressing and control electronics to which are also connected ends of the strips of silver ink comprising the line conductors of &:he panel.

The writing of this matrix panel can be performed row after row. A writing voltage is applied between, on the one hand, all of the selected columns and, on the other hand, a given row. The selected pixels of the considered row are thus darkened without darkening the non-selected pixels of the same row, nor those of the previous and following rows. This results from the high value of the voltage threshold with respect to the writing voltage, as well as from the favorable memory characteristics.

According to a variant embodiment of the present device, the plastic sheet used as a primary substrate is a sheet coated with a layer of hydrophobic silicone resin having a low adherence to the layers deposited on it. After producing the panel, this sheet is removed, and has therefore served only as a convenient intermediary in the production of the display panel.

Example 11

This example relates to a direct addressed display panel intended for a seven-segment alphanumerical character (FIGS. 16, 17, 18, 19 and 20).

Such a panel enables one of the ten FIGS. 0 to 9, respectively, to be produced from the seven linear juxtaposed segments 31A, 31B, 31C, 31D, 31E, 31F, and 31G. This arrangement is known, and comprises four segments distributed in twos end to end along two longitudinal parallel lines, and three transverse segments respectively upper 31E, lower 31F and middle 31G.

This panel comprises a front section facing the reader at the rear section, a glass plate 32 and on the rear face of the latter, an electronically conductive and transparent layer or thin coating (for example, of tin oxide) forming the working electrode 2. In a first variant (FIGS. 18 and 19), portions of a layer of electrolytic material 3 (such as that previously described) and portions of a layer of counter-electrode 4 (also such as previously described) are superimposed, facing each other, arranged to constitute the segments 31A to 31G mentioned above. According to the general structure already described above, the layer of electrolytic material 3 is in contact with the working electrode 2, while a counter-electrode 4 is in contact with the material 3. The different segments 31A to 31G are separated from each other by spaces 33 which can be very small (for example, a separation of the order of 0.5 mm for a character of about 12 cm in height). In a second variant (FIG. 11), the layer of electrolytic material 3 occupies almost all of the surface of the conductive transparent layer of the working electrode 2 with the exception of a peripheral strip 34.

In these two described embodiments, there are provided filiform conductors of electricity forming current leads to the transparent electrode 2 comprising a conductive ink or paste or equivalent as previously described. More precisely, and in the case of an alphanumerical character with seven segments 31A to 31G, there are provided three filiform or long thin conductors 35A, 35B, 35C surrounding the segments 31A to 31G, respectively outside and inside, as shown in FIG.

16. This arrangement enables supply and distribution of electrical energy which is as regular and satisfactory as possible for the different segments.

The method of producing the electrical connector material forming the filiform or long thin conductors 35A, 35B, 35C (as well as their association with the plate 32 from the side of the layer and forming the working electrode 2) have already been previously described and are not described again here.

Furthermore, conductors of electricity are provided in the form of strips 36, each belonging to and applied in contact with a segment 31A to 31G and of similar form but of dimensions smaller than those of the segments 31A to 31G, comprising a conductive ink or paste or equivalent (also previously described), forming a current lead to the counter-electrodes 4 of the segments 31A to 316.

In fact, in general, in this type of application, the area available for application of this conductive material to the counter-electrode 4 is larger than that which is possible on the electrode 2. In addition, the strips 35 are not visible from the front face of the panel. In this application, which functions by reflection, and in the indicated structure, it is necessary to provide a masking material 37 constituting a background for the panel. This masking material 37 is arranged in a layer, of course not hiding the filiform or long thin conductors 35A, 35B, 35C and the portions of layer of material 3. Such a masking material 37 has also been described previously, and is not described again here. The masking material covers the edges of the portions of layers of electrolytic material 3 and of the counter-electrodes 4 and partially the rear side of the latter, contributing to cohesion of the panel and providing insulation of the cells thus fabricated.

The means of electrical connection and of complementary mechanical support of the panel comprise a rear plate 38 which is parallel to the glass plate 32, and which is able to be associated with the latter particularly by its edges by a joining seal 39, particularly of silicone elastomer. Such a seal 39 has capacity to absorb differences of movement between the rear plate 38 and the glass plate 32.

Figures 18, 19:
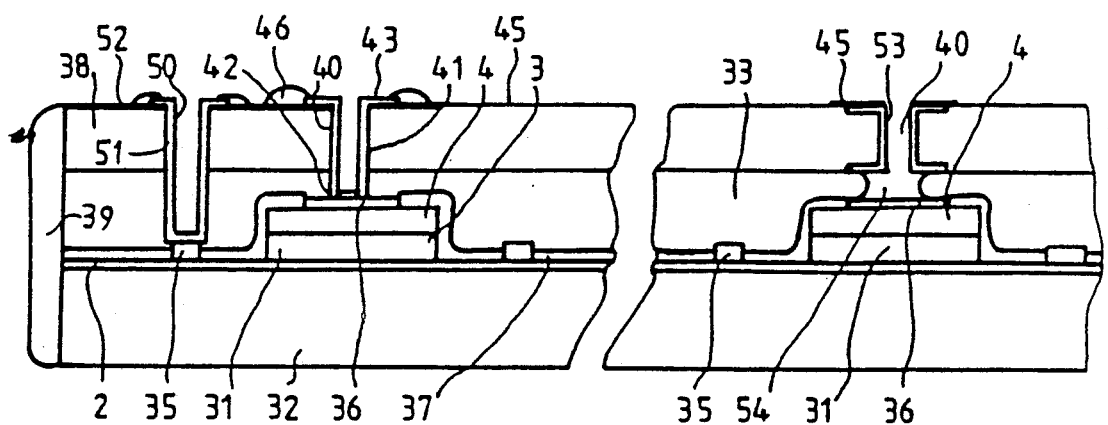
FIGS. 18, 19 and 20 are partial cross-sectional views of the embodiment of FIGS. 16 and 17.

In an embodiment illustrated more particularly by FIG. 18, the plate 38 is a printed circuit board. It comprises, at the right of a strip 36, a hole 40 in which can be engaged an electrically conductive jumper 41 which, by its inner end 42 comes into electronic contact with the band 36. By its external turned down edge 43, it is applied to the external face 44 of the plate 38 in contact with a flat conductor 45 of the plate 38 on which it can be maintained and electrically associated by means of a conductive ink or paste or equivalent 46.

The various conductors 45 (seven in this case) corresponding to the various segments 31A to 31G are electrically associated with a plug-in connector 47 located on an edge of the plate 38. This plug-in connector 47 has eight positions, seven of which, 48, correspond to the seven counter-electrodes 4 of the segments 31A to 31G via the conductors 45 and the jumpers 41, and one, 49, which corresponds to the electrode 2 via other jumpers 50, passing through other holes 51 to the right of the filiform or long thin conductors 35A, 350, 35C. The jumpers 50 are arranged on a conductor 52 of the plate 38, this conductor 52 comprising the rear electrically conductive surface of this plate, with the exception of the conductors 45. The different conductors 45 and 52 are insulated from each other.

According to another variant (FIG. 19), electrical connecting sleeves 53 extending the conductors 45 and 52 are provided in the holes 40 and 51. In each of these sleeves, there is inserted a drop of electrical connecting material 54 (such as a conductive ink or paste or equivalent) which comes into contact with the strips 36 or the conductors 35A, 35B, 35C, and provides an electrical "weld" at these places.

The two variant embodiments shown in FIGS. 18 and 19 correspond to the third variant shown in the previously described FIG. 8C.

Figure 20:
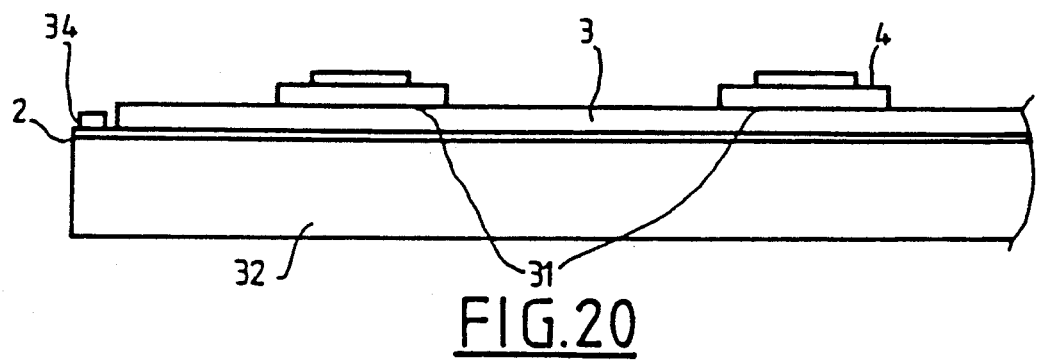

The panel can also be produced according to the first variant of FIG. 8A, also described (FIG. 20). For this purpose, the electrolytic material forms a continuous layer 3 and no longer a divided layer into segments. This also enables the layer of material 3 to form a contrasting background for the image segments 31A to 31G. The counter-electrodes 4 are produced as before, as are the current leads and electrical connections with regard to the counter-electrodes 4. In this case, the contour of the counter-electrodes 4 defines the shape of the picture elements 31A to 31G.

The current leads of the working electrode 2 are produced either by means of a filiform conductor surrounding the plate 32 on its inside face, at the periphery (that is, on the layer comprising the electrode 2 and outside the layer of electrolytic material 3, that is, in the peripheral strip 34), or by dots. These dots are distributed appropriately to ensure an appropriate distribution of the electrical energy.

Figure 21:
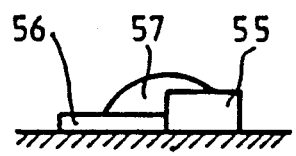
FIG. 21 is a detailed partial cross-section view of an alternative embodiment for electrical connection.

According to a detail of embodiment shown in FIG. 21, it is possible to associate with the current leads made from a first electronically conductive material 55 (such as a conductive ink or paste or equivalent as previously described) a strip or wire 56 made from a second more conductive material (for example, a copper strip or wire). This second material 56, poorly resistive, is in electrical connection with the previous current leads 55 by overlapping or partial potting by means of an additional amount 57 of the first material.

Example 12

Figure 22:
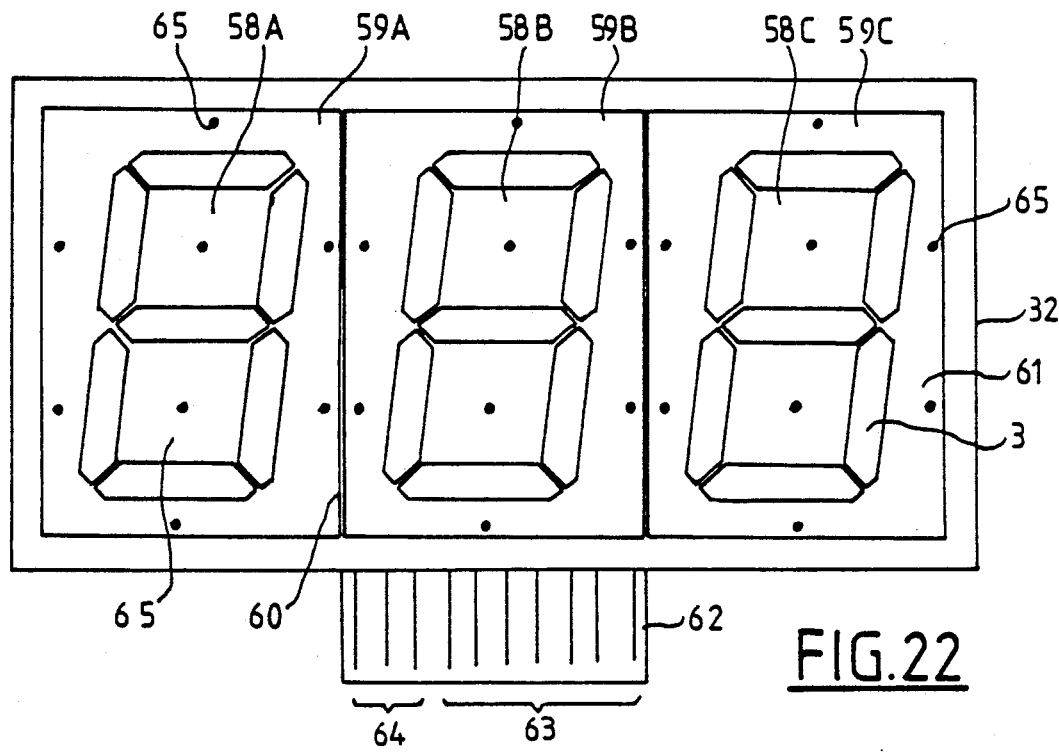
FIGS. 22 and 23 are front elevation views of a panel according to the embodiment of Example 12.

In FIG. 22 there is shown another variant embodiment of a display panel comprising several (in particular three on this occasion) characters 58A, 58B, 58C, each having seven segments, each as described before. These three characters 58A, 58B, 58C therefore enable display of a number between 000 and 999. The three characters 58A, 58B, 58C are juxtaposed. The panel is divided into three zones 59A, 59B and 59C, respectively, on each of which there are three characters 58A, 55B and 58C respectively.

For this purpose, the working electrode 2 and, in particular, the conductive layer on the glass plate 32 is itself distributed in three electrically distinct and juxtaposed portions. The portions are separated from each other by a minimum space, such as 60, which can be as little as about ten micron wide. The layer of electrolytic material 3, of white color, is distributed in portions of layers having the shape, size and location of the segments constituting each character 58A, 58B, 58C. The space 61 outside the segments is covered with a layer of white masking and contrasting material.

In a first form of implementation, the counter-electrodes 4 of identical segments of the three characters 58A, 58B, 58C can be connected to each other in parallel. Furthermore, in this same first form of implementation, each of the portions of a layer, as regards the working electrode 2, is separately fed. The panel thus fabricated comprises a plug-in connector 62 having ten outputs (namely seven outputs 63 for the seven counter-electrodes 4 of seven similar segments of the three characters 58A, 58B, 58C, and three outputs 64 for the three portions of transparent working electrodes 2).

The number of electrical connections is limited, while allowing control of the writing of the different characters in time sharing mode. The particular embodiment of each character can conform with that which has been previously described in the case of a single character in Example 11.

According to a variant embodiment (FIG. 22) the electrical current lead relating to the electrode 2 can be made in the form of a plurality of dots such as 65 instead of filiform and long thin conductors such as those previously described in Example 11. These dots are distributed around the characters 58A, 58B, 58C in order to ensure an electrical energy distribution as appropriate as possible. Also, as a variant, the masking material is black instead of white and the points 65 are black.

Figure 23:
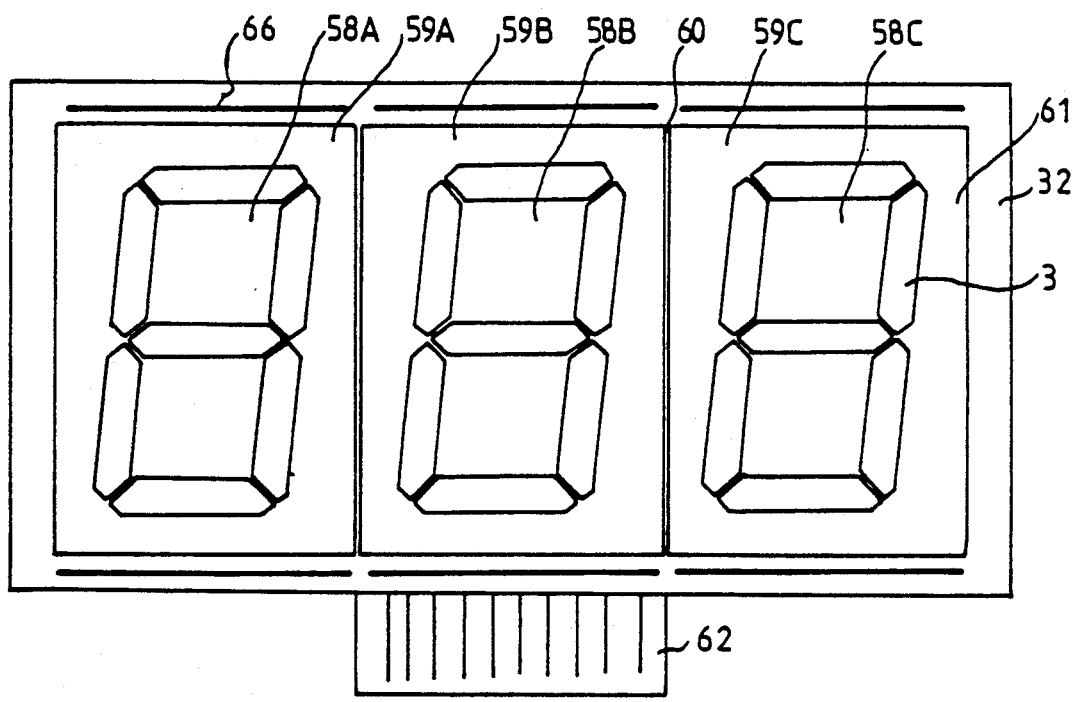
Figure 24:
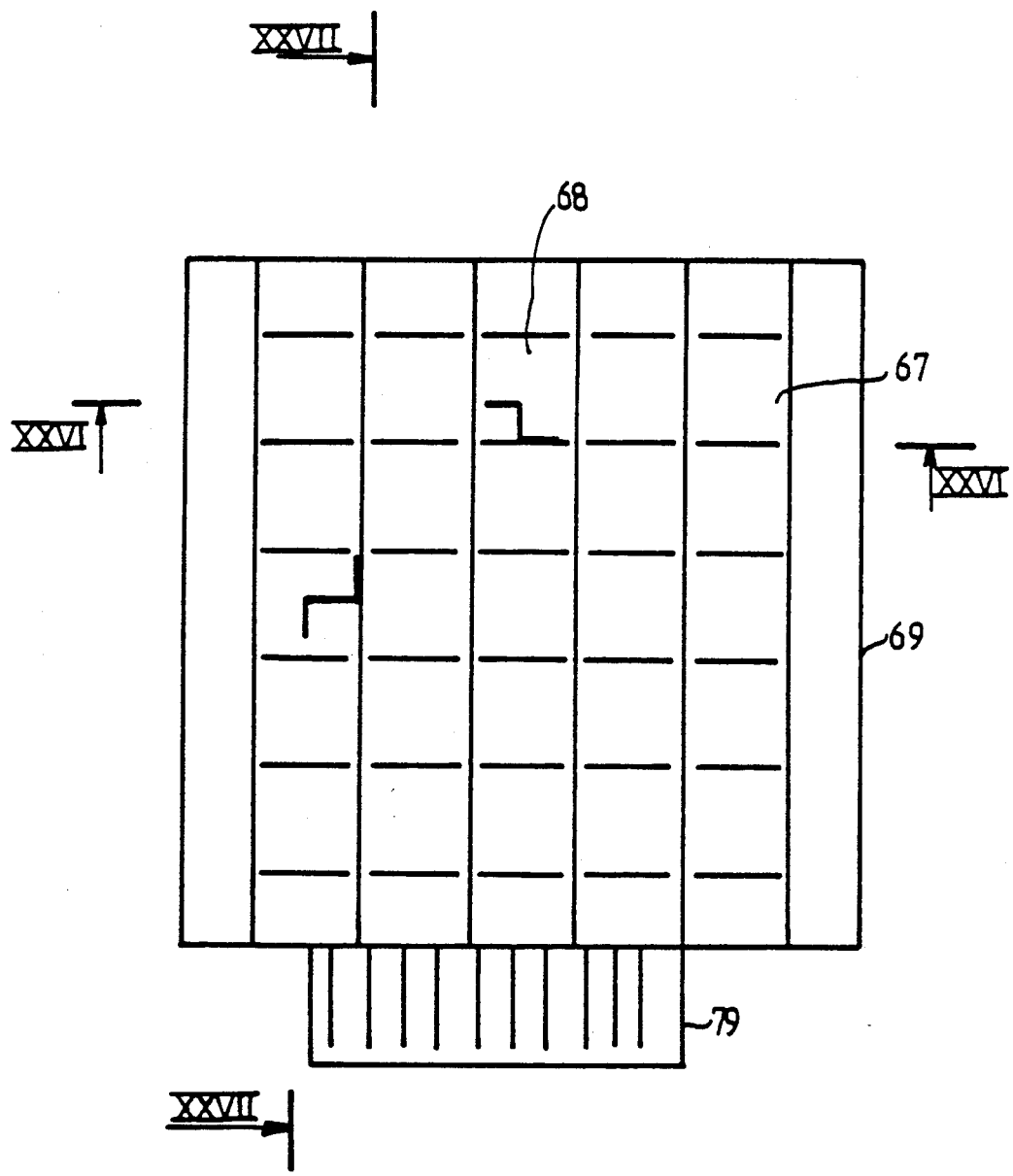
FIG. 24 is a front elevation of a panel according to the embodiment of Example 13.
Figure 25:
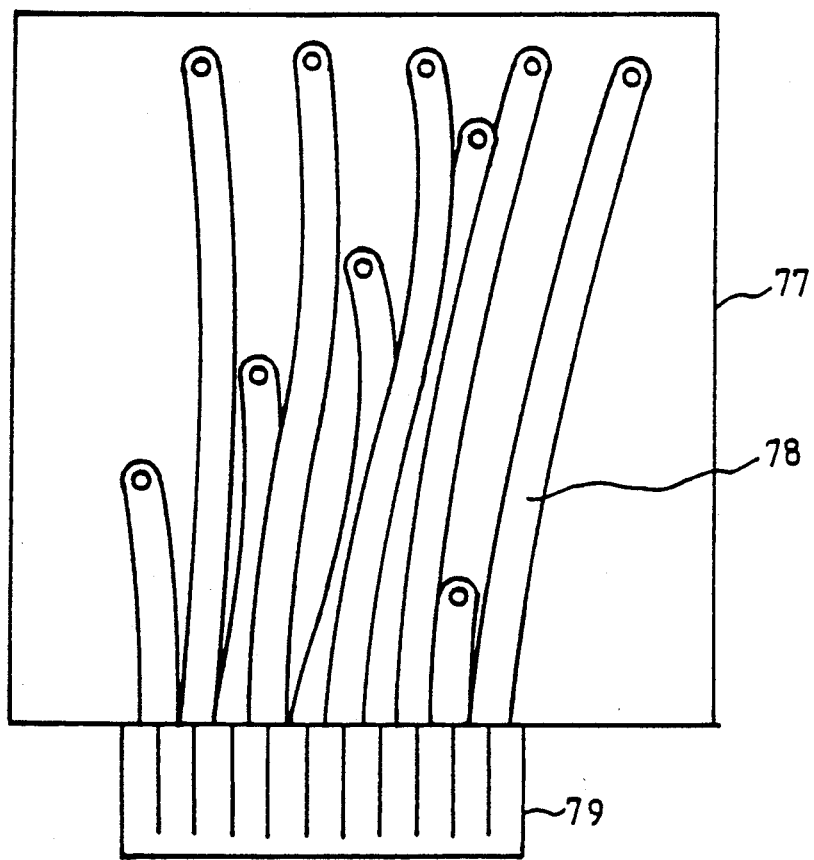
FIG. 25 is a rear elevation of a panel according to the embodiment of Example 13.
Figure 26:
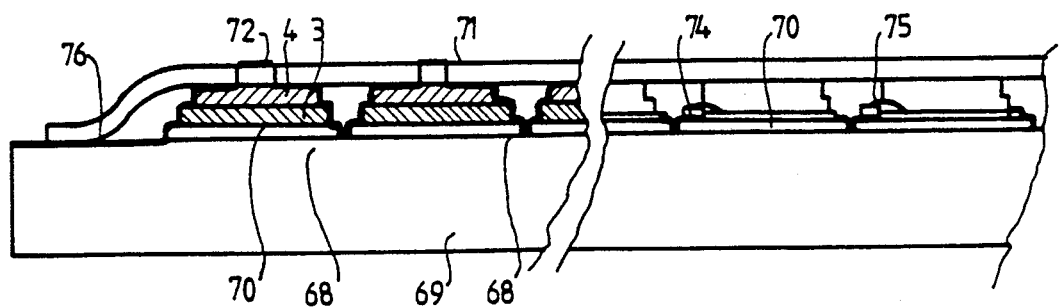
FIG. 26 is a cross-sectional view taken along the line XXVI—XXVI of FIG. 24.
Figure 27:
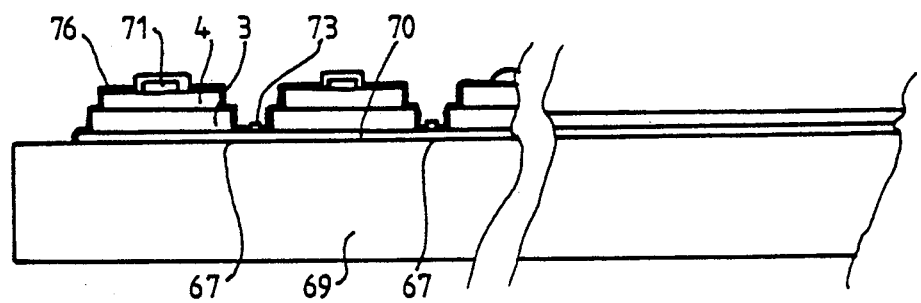
FIG. 27 is a cross-sectional view taken along the line XXVII—XXVII of FIG. 24.

As a variant (FIG. 23), the electrical distribution relating to the electrode 2 can be produced not by dotted current leads such as 65 as just described, but by longitudinal strips 66 arranged on the edges of the panel at a place where there is no electrolytic material 3. This variant enables the various combinations of coordinated patterns which were previously described with reference to the diagrams of FIGS. 8. In particular, the layer of electrolytic material 3 can be continuous, which enables the presence of a masking material to be avoided.

A second form of implementation (not shown) essentially differs from that which has just been described by the fact that, on the one hand, the transparent conductive working electrode is common to all of the characters (that is, common to all of the elementary cells of the device). On the other hand, the working electrode and each counter-electrode are individually electrically connected either to one or several connection zones situated on the rear side of the panel comprising the glass substrate and the components of the device previously mentioned, or to a connector integral with a printed circuit board applied to the rear side of the panel, or to means of contacts situated to the right of the electrodes and supported by the frame of the device with which the display board is integrated.

In the considered case which comprises three characters, each having seven segments, electrical connection with the external supply and control electronics is produced by means of twenty-two independent conductors. In the case of using a printed circuit board, electrical connection between each current lead and the corresponding conductor of the plate can be produced as described in Example 11.

Example 13

Another exemplary embodiment is now described, relating to a matrix display panel (FIGS. 24 to 27) enabling the display, for example, of alphanumerical characters.

Such a panel comprises picture elements arranged at the intersections of several rows 67 and several columns 68, juxtaposed and identical to each other and thus comprising a matrix. The matrix enables, depending on the control given, a writing of an alphanumerical character, sign or desired figure. In this example, the panel comprises a front glass plate 69, on the rear face of which are produced transparent and electrically conductive strips 70 constituting electrodes 2, each common to all of the cells of a same column 68. The strips 70 can be very close to each other, separated by the gaps just necessary for avoiding electrical contact between them, depending on the technique used.

In this example, the portions of layer of electrolytic material 3 and the counter-electrodes 4 are superimposed, of the same shape, and of the same dimensions. They are located at the position of each row 67 and column 68 node, in order to determine each of the pixels, whose largest dimension in the direction of the rows is slightly less than the width of the strips 70, being totally located to the right and inside of one of these strips 70. On the rear side of each counter-electrode 4, a current lead is produced by means of a connection material already described for such leads.

To each of the rows, an electrical conductor 71 (such as a copper strip) electrically connects the various counter-electrodes 4 of a same row 67 to each other on their rear side. The association and the contact between this conductor 71 and the current leads of the counter-electrodes 4 is produced by means of an additional amount 72 of the same overlapping or cladding material as the lead itself. An electrical insulator separates the conductor 71 from the other conductive components of the panel in the gaps between the picture elements.

In the form of embodiment in which the picture elements are of small size (for example, those of the pixels of a computer screen), it is generally sufficient to provide current leads for the working electrodes 2 only at the edges of the strip 70.

In the form of embodiment shown in which the picture elements have a large unit area, the generally modest conductivity of the working electrodes 2 can give rise to a non-uniform electrical feeding of the elementary cells. There is provided a mode of distribution of electrical current to a strip 72 comprising current leads 73 arranged in sections of filiform lines parallel to the lines 67 and placed between the picture elements while being insulated from the electrolytic material and the counter-electrodes 4. As a variant, the leads can be distributed as dots. Furthermore, the current leads 473 of a same strip 70 are connected to each other by means of a collector-conductor 74. This may be, for example, a copper strip or string of silver lacquer arranged along the corresponding column 68 and connected to the leads 73 of this corresponding column by an additional amount 75 of this lead material producing the partial cladding or overlap. An electrical insulator separates the collector conductor 74 from all of the other conductive components of the panel.

Furthermore, there is provided a masking material 76 in a layer covering the rear face of the glass plate 69 with the exception of the zones in which the electrolytic material is located, as well as the zones reserved for electrical connections to the electrodes. This arrangement is such that the collector-conductors 74 are masked by the masking material 76 and can, without prejudice, be placed at any desired position, provided that the collector-conductor 74 of a column 68 is not in electrical contact with the current leads 73 of the adjacent column 68.

For this purpose, and in default of intermediate electrical insulation, the length (in the direction of lines 67) of the leads 73 is sufficient without being excessive in order not to interfere with the collector-conductor 74 of the adjacent column 68. In this embodiment, the electrical conductors 71 cross the collector-conductors 74 without electrical contact (for example, by means of an intermediate insulator). In the case in which the collector-conductors 74 are sufficiently rigid copper strips, there is no electrical contact with the conductors 71 between each other, given that they are located in two distinct planes separated from each other by a gap equal to the thickness of the cell, the air forming an insulator. In fact, the collector-conductors 74 are placed in the vicinity of the plane of the rear face of the plate 69, while the electrical conductors 71 are placed in another separated plane corresponding to the free rear surface of the counter-electrodes 4.

Such a panel can also be associated, towards the rear, with a printed circuit board 77 providing the electrical contacts with the conductors 71 of each row 67 and the collector-conductors 74 of each column 68. In the case shown, in which the panel comprises five rows 67 and five columns 68, the printed circuit panel 77 comprises ten conductors 78 insulated from each other which can be connected to a lateral plug-in connector 79 having ten positions as described in Example 11. Thereafter, by applying the required electrical voltage difference between an electrical conductor 71 and a collector-conductor 74 via the plug-in connector 79 and the conductors 78, the writing of the picture element corresponding to the intersection of the row and column 67 and 68 is enabled, corresponding to these conductors 71 and 74. Furthermore, it is possible to apply the electrical writing voltage between a single electrical conductor 46 and several collector-conductors 74 or, conversely, between a single collector-conductor 74 and several conductors 71.

This embodiment can itself be the subject of numerous variants.

First, the very size of the picture elements can vary from very small (such as the pixels of a computer screen) to very large (for example, the picture elements having a size in the order of a centimeter or more), particularly in the case of a public information display panel. The variants then concern the coordination of the constitutive patterns of the panal. In the described embodiment, the working electrodes in the form of strip 70 are common to each column 68 and separated between the columns 68. The portions of the layer of electrolytic material 3 and the counter-electrodes 4 are separate, each belonging to an elementary cell.

But, in other variant embodiments, it is possible to design other combinations of pattern coordinations, as has been described with reference to FIGS. 8. The variants can also relate to internal electrical connections of the display device, particularly in accordance with that which was mentioned in the previous examples.

Finally, variants can relate to the very method of manufacture of such a panel as previously described.

What is claimed is:

1. A material intended for processes, cells, or devices relating to electrochromic modulation of light by reflection or transmission, the material having ionic electroconductivity and comprising a homogeneous mixture of solid consistency, comprising the following constituents:
   a) a hydrosoluble salt or a hydrosoluble mixture of salts of at least one metal which can be cathodically deposited from an aqueous solution of one of its simple or complex ions;
   b) at least one initially hydrosoluble film-forming polymer resin;
   c) water; and
   d) an auxiliary redox couple;
   wherein the constituents are selected so as to allow plastic or viscoelastic deformability; and
   wherein the material is able to reversibly (1) develop metal or metal alloy deposits by cathodic reduction of at least one depositable metal ion present within the material, and (2) by anodic oxidation, dissolve the deposits and reincorporate into their original state the metal ion or ions produced by this oxidation.

2. The material according to claim 1, wherein the constituents are further selected so as to allow adhesive properties.

3. The material according to claim 1, wherein the initially hydrosoluble film-forming polymer resins are in the proportion of one part by weight to 0.005 to 50 parts of such salts considered in their anhydrous form.

4. The material according to claim 1, wherein the auxiliary redox couple is, in its reduced form, colorless or only slightly colored.

5. The material according to claim 4, wherein the auxiliary redox couple is, in its reduced form, hydrosoluble in the presence of the other hydrosoluble constituents of the material, and forms an homogeneous mixture with the constituents.

6. The material according to claim 1, wherein the metal of the hydrosoluble salts or hydrosoluble mixture of salts is selected from the group consisting of zinc, cadmium, lead, silver, copper, iron, cobalt, nickel, tin, indium, platinum, palladium, gold, bismuth, antimony, tellurium, manganese, thallium, selenium, gallium, arsenic, mercury, chromium, tungsten and molybdenum.

7. The material according to claim 6, wherein copper is associated with at least one other metal selected from the group.

8. The material according to claim 1, wherein the material further comprises at least one hydrosoluble salt of a cation selected from a group consisting of those which cannot be either electro-deposited from an aqueous solution or reduced into a metal.

9. The material according to claim 8, wherein the cation which cannot be electro-deposited from an aqueous solution is selected from a group consisting of the alkali metals, the alkaline-earths, aluminum, beryllium, and rare earths which cannot be electro-deposited from an aqueous solution.

10. The material according to claim 8, wherein the cation which cannot be reduced into a metal is selected from a group consisting of ammonium ion and quaternary ammonium ions.

11. The material according to claim 1, wherein the material further comprises halide anions.

12. The material according to claim 1, wherein the hydrosoluble salt or the hydrosoluble mixture of salts is hygroscopic in the presence of atmospheric humidity.

13. The material according to claim 12, wherein the hydrosoluble salt or the hydrosoluble mixture of salts is further deliquescent in the presence of atmospheric humidity.

14. The material according to claim 1, wherein the ratio of hydrosoluble salts considered in their anhydrous form to water is greater than 0.5.

15. The material according to claim 1, wherein the ratio of hydrosoluble salts considered in their anhydrous form to water is greater than 1.

16. The material according to claim 1, wherein the initially hydrosoluble film-forming polymer resin is selected from a group consisting of polyoxyethylene, polyvinylpyrrolidone, polyvinyl alcohol, the cellulose ethers, sodium alginate, polyacrylic acid and its derivatives, gelatin, gum arabic, polystyrene sulphonic acid and polyacrylamide.

17. The material according to claim 1, wherein the material further comprises at least one dispersed particulate solid.

18. The material according to claim 17, wherein the dispersed particulate solid is a masking and contrasting pigment.

19. The material according to claim 17, wherein the material comprises at least one white pigment such as titanium dioxide.

20. The material according to claim 17, wherein the material comprises at least one colored pigment.

21. The material according to claim 1, wherein the material comprises at least one homogeneously mixed hydrosoluble dye or coloring agent.

22. The material according to claim 1, wherein the material further comprises at least one acid.

23. The material according to claim 21, wherein the acid is selected from a group consisting of hydrochloric acid, hydrobromic acid, acetic acid, perchloric acid, chloric acid, formic acid, nitric acid.

24. The material according to claim 1, wherein the material further comprises at least one cross-linking or vulcanization agent of the resin.

25. The material according to claim 1, wherein the material further comprises at least one complexing agent.

26. The material according to claim 1, wherein the material further comprises at least one agent having a function of favoring formation of a layer and application of a layer of the material.

27. The material according to claim 26, wherein the agent is a surface-active or wetting agent.

28. A material intended for processes, cells, or devices relating to electrochromic modulation of light by reflection or transmission, the material having ionic electroconductivity and comprising a homogeneous mixture of solid consistency, comprising the following constituents:
   a) a hydrosoluble salt or a hydrosoluble mixture of salts of at least one metal which can be cathodically deposited from an aqueous solution of one of its simple or complex ions;
   b) at least one initially hydrosoluble film-forming polymer resin;
   c) water;
   d) at least one hydrosoluble salt of a cation selected from a group consisting of those which cannot be either electro-deposited from an aqueous solution or reduced into a metal; and
   e) an auxiliary redox couple;
   wherein the constituents are selected in a group allowing simultaneously a plastic or viscoelastic deformability and adhesive properties; and
   wherein the material is able to reversibly (1) develop metal or metal alloy deposits by cathodic reduction of at least one depositable metal ion present within the material, and (2) by anodic oxidation, dissolve the deposits and reincorporate into their original state the metal ion or ions produced by this oxidation.

29. A material intended for processes, cells, or devices relating to electrochromic modulation of light by reflection or transmission, the material having ionic electroconductivity and comprising a homogeneous mixture of solid consistency, comprising the following constituents:
   a) a hydrosoluble salt or a hydrosoluble mixture of salts of at least one metal which can be cathodically deposited from an aqueous solution of one of its simple or complex ions, the ratio of the hydrosoluble salts considered in their anhydrous form to water being greater than 1;
   b) at least one initially hydrosoluble film-forming polymer resin;
   c) water;
   d) at least one hydrosoluble salt of a cation selected from a group consisting of those which cannot be either electro-deposited from an aqueous solution or reduced into a metal; and
   e) an auxiliary redox couple;
   wherein the constituents are selected in a group allowing simultaneously a plastic or viscoelastic deformability and adhesive properties; and
   wherein the material is able to reversibly (1) develop metal or metal alloy deposits by cathodic reduction of at least one depositable metal ion present within the material, and (2) by anodic oxidation, dissolve the deposits and reincorporate into their original state the metal ion or ions produced by this oxidation.

30. A material intended for processes, cells, or devices relating to electrochromic modulation of light by reflection or transmission, the material having ionic electroconductivity and comprising a homogeneous mixture of solid consistency, comprising the following constituents:
   a) a hydrosoluble salt or a hydrosoluble mixture of salts of at least one metal which can be cathodically deposited from an aqueous solution of one of its simple or complex ions, hygroscopic in the presence of atmospheric humidity, the ratio of the hydrosoluble salts considered in their anhydrous form to water being greater than 1;
   b) at least one initially hydrosoluble film-forming polymer resin;
   c) water;
   d) at least one hydrosoluble salt of a cation selected from a group consisting of those which cannot be either electro-deposited from an aqueous solution or reduced into a metal; and
   e) an auxiliary redox couple;
   wherein the constituents are selected in a group allowing simultaneously a plastic or viscoelastic deformability; and
   wherein the material is able to reversibly (1) develop metal or metal alloy deposits by cathodic reduction of at least one depositable metal ion present within the material, and (2) by anodic oxidation, dissolve the deposits and reincorporate into their original state the metal ion or ions produced by this oxidation.

31. A material intended for processes, cells, or devices relating to electrochromic modulation of light by reflection or transmission, the material having ionic electroconductivity and comprising a homogeneous mixture of solid consistency, comprising the following constituents:
   a) a hydrosoluble salt or a hydrosoluble mixture of salts of at least one metal which can be cathodically deposited from an aqueous solution of one of its simple or complex ions;

b) at least one initially hydrosoluble film-forming polymer resin;
c) water;
d) at least one hydrosoluble salt of a cation selected from a group consisting of those which cannot be either electro-deposited from an aqueous solution or reduced into a metal; and
e) an auxiliary redox couple;

wherein the constituents are selected in a group allowing simultaneously a plastic or viscoelastic deformability and adhesive properties;

wherein copper associated with at least one metal selected from a group consisting of zinc, cadmium, lead, silver, copper, iron, cobalt, nickel, tin, indium, platinum, palladium, gold, bismuth, antimony, tellurium, manganese, thallium, selenium, gallium, arsenic, mercury, chromium, tungsten and molybdenum; and wherein the material is able to reversibly (1) develop metal or metal alloy deposits by cathodic reduction of at least one depositable metal ion present within the material, and (2) by anodic oxidation, dissolve the deposits and reincorporate into their original state the metal ion or ions produced by this oxidation.

32. A material intended for processes, cells, or devices relating to electrochromic modulation of light by reflection or transmission, the material having ionic electroconductivity and comprising a homogeneous mixture of solid consistency, comprising the following constituents:
a) a hydrosoluble salt or a hydrosoluble mixture of salts of at least one metal which can be cathodically deposited from an aqueous solution of one of its simple or complex ions;
b) at least one initially hydrosoluble film-forming polymer resin;
c) water;
d) at least one hydrosoluble salt of a cation selected from a group consisting of those which cannot be either electro-deposited from an aqueous solution or reduced into a metal;
e) halide anions; and
f) an auxiliary redox couple;

wherein the constituents are selected in a group allowing simultaneously a plastic or viscoelastic deformability and adhesive properties; and wherein the material is able to reversibly (1) develop metal or metal alloy deposits by cathodic reduction of at least one depositable metal ion present within the material, and (2) by anodic oxidation, dissolve the deposits and reincorporate into their original state the metal ion or ions produced by this oxidation.

33. A material intended for processes, cells, or devices relating to electrochromic modulation of light by reflection or transmission, the material having ionic electroconductivity and comprising a homogeneous mixture of solid consistency, comprising the following constituents:
a) a hydrosoluble salt or a hydrosoluble mixture of salts of at least one metal which can be cathodically deposited from an aqueous solution of one of its simple or complex ions;
b) at least one initially hydrosoluble film-forming polymer resin;
c) water;
d) at least one hydrosoluble salt of a cation selected from a group consisting of those which cannot be either electro-deposited from an aqueous solution or reduced into a metal;
e) halide anions; and
f) an auxiliary redox couple;

wherein the constituents are selected in a group allowing simultaneously a plastic or viscoelastic deformability and adhesive properties;

wherein copper is associated with at least one metal selected from a group consisting of zinc, cadmium, lead, silver, copper, iron, cobalt, nickel, tin, indium, platinum, palladium, gold, bismuth, antimony, tellurium, manganese, thallium, selenium, gallium, arsenic, mercury, chromium, tungsten and molybdenum; and wherein the material is able to reversibly (1) develop metal or metal alloy deposits by cathodic reduction of at least one depositable metal ion present within the material, and (2) by anodic oxidation, dissolve the deposits and reincorporate into their original state the metal ion or ions produced by this oxidation.

34. A material intended for processes, cells, or devices relating to electrochromic modulation of light by reflection or transmission, the material having ionic electroconductivity and comprising a homogeneous mixture of solid consistency, comprising the following constituents:
a) a hydrosoluble salt or a hydrosoluble mixture of salts of at least one metal which can be cathodically deposited from an aqueous solution of one of its simple or complex ions, the ratio of the hydrosoluble salts considered in their anhydrous form to water being greater than 1;
b) at least one initially hydrosoluble film-forming polymer resin;
c) water;
d) at least one hydrosoluble salt of a cation selected from a group consisting of those which cannot be either electro-deposited from an aqueous solution or reduced into a metal;
e) halide anions; and
f) an auxiliary redox couple;

wherein the constituents are selected in a group allowing simultaneously a plastic or viscoelastic deformability and adhesive properties;

wherein copper is associated with at least one metal selected from a group consisting of zinc, cadmium, lead, silver, copper, iron, cobalt, nickel, tin, indium, platinum, palladium, gold, bismuth, antimony, tellurium, manganese, thallium, selenium, gallium, arsenic, mercury, chromium, tungsten, and molybdenum; and wherein the material is able to reversibly (1) develop metal or metal alloy deposits by cathodic reduction of at least one depositable metal ion present within the material, and (2) by anodic oxidation, dissolve the deposits and reincorporate into their original state the metal ion or ions produced by this oxidation.

35. A process for manufacturing a material according to 1, comprising the following successive steps:
1) fabricating at least one fluid formative composition comprising the constituents of the material and water in quantities allowing a viscosity appropriate for its application as a layer; and 2) acting on the fluid formative composition to obtain the solid consistency of the material.

36. The process according to claim 35, wherein the step of acting on the fluid formative composition comprises evaporation, heat treatment, cross-linking or vulcanization.

37. A process for manufacturing a material according to claim 28, comprising the following successive steps:
   1) fabricating at least one fluid formative composition comprising the constituents of the material and water in quantities allowing a viscosity appropriate for its application as a layer; and
   2) acting on the fluid formative composition to obtain the solid consistency of the material.

38. The process according to claim 37, wherein the step of acting on the fluid formative composition comprises evaporation, heat treatment, cross-linking or vulcanization.

39. A process for manufacturing a material according to claim 29, comprising the following successive steps:
   1) fabricating at least one fluid formative composition comprising the constituents of the material and water in quantities allowing a viscosity appropriate for its application as a layer; and
   2) acting on the fluid formative composition to obtain the solid consistency of the material.

40. The process according to the claim 39, wherein the step of acting on the fluid formative composition comprises evaporation, heat treatment, cross-linking or vulcanization.

41. A process for manufacturing a material according to claim 30, comprising the following successive steps:
   1) fabricating at least one fluid formative composition comprising the constituents of the material and water in quantities allowing a viscosity appropriate for its application as a layer; and
   2) acting on the fluid formative composition to obtain the solid consistency of the material.

42. The process according to claim 41, wherein the step of acting on the fluid formative composition comprises evaporation, heat treatment, cross-linking or vulcanization.

43. A process for manufacturing a material according to claim 31, comprising the following successive steps:
   1) fabricating at least one fluid formative composition comprising the constituents of the material and water in quantities allowing a viscosity appropriate for its application as a layer; and
   2) acting on the fluid formative composition to obtain the solid consistency of the material.

44. The process according to claim 43, wherein the step of acting on the fluid formative composition comprises evaporation, heat treatment, cross-linking or vulcanization.

45. A process for manufacturing a material according to claim 32, comprising the following successive steps:
   1) fabricating at least one fluid formative composition comprising the constituents of the material and water in quantities allowing a viscosity appropriate for its application as a layer; and
   2) acting on the fluid formative composition to obtain the solid consistency of the material.

46. The process according to claim 45, wherein the step of acting on the fluid formative composition comprises evaporation, heat treatment, cross-linking or vulcanization.

47. A process for manufacturing a material according to claim 33, comprising the following successive steps:
   1) fabricating at least one fluid formative composition comprising the constituents of the material and water in quantities allowing a viscosity appropriate for its application as a layer; and
   2) acting on the fluid formative composition to obtain the solid consistency of the material.

48. The process according to claim 47, wherein the step of acting on the fluid formative composition comprises evaporation, heat treatment, cross-linking or vulcanization.

49. A process for manufacturing a material according to claim 34, comprising the following successive steps:
   1) fabricating at least one fluid formative composition comprising the constituents of the material and water in quantities allowing a viscosity appropriate for its application as a layer; and
   2) acting on the fluid formative composition to obtain the solid consistency of the material.

50. The process according to claim 49, wherein the step of acting on the fluid formative composition comprises evaporation, heat treatment, cross-linking or vulcanization.

* * * * *